(12) United States Patent
Libal et al.

(10) Patent No.: US 10,317,102 B2
(45) Date of Patent: Jun. 11, 2019

(54) GEOFENCING FOR THERMOSTATIC CONTROL

(71) Applicant: Ademco Inc., Golden Valley, MN (US)

(72) Inventors: Vit Libal, Prague (CZ); Pavel Vacha, Prague (CZ); Ondrej Kopicka, Opava (CZ); Marek Sikora, Kurim (CZ)

(73) Assignee: ADEMCO INC., Golden Valley, MN (US)

( * ) Notice: Subject to any disclaimer, the term of this patent is extended or adjusted under 35 U.S.C. 154(b) by 56 days.

(21) Appl. No.: 15/490,879

(22) Filed: Apr. 18, 2017

(65) Prior Publication Data

US 2018/0299152 A1    Oct. 18, 2018

(51) Int. Cl.
| | | |
|---|---|---|
| F24F 11/00 | (2018.01) | |
| F24F 11/30 | (2018.01) | |
| H04W 4/021 | (2018.01) | |
| G05B 13/04 | (2006.01) | |
| F24F 11/62 | (2018.01) | |
| G05B 19/042 | (2006.01) | |
| F24F 11/52 | (2018.01) | |
| F24F 120/12 | (2018.01) | |
| F24F 120/10 | (2018.01) | |

(52) U.S. Cl.
CPC .............. *F24F 11/30* (2018.01); *F24F 11/62* (2018.01); *G05B 13/048* (2013.01); *G05B 19/042* (2013.01); *H04W 4/021* (2013.01); *F24F 11/52* (2018.01); *F24F 2120/10* (2018.01); *F24F 2120/12* (2018.01); *G05B 2219/2614* (2013.01)

(58) Field of Classification Search
CPC combination set(s) only.
See application file for complete search history.

(56) References Cited

U.S. PATENT DOCUMENTS

| | | |
|---|---|---|
| 5,317,670 A | 5/1994 | Elia |
| 6,255,988 B1 | 7/2001 | Bischoff |
| 6,356,282 B2 | 3/2002 | Roytman et al. |
| 6,400,956 B1 | 6/2002 | Richton |
| 6,478,233 B1 | 11/2002 | Shah |
| 6,529,137 B1 | 3/2003 | Roe |

(Continued)

FOREIGN PATENT DOCUMENTS

| | | |
|---|---|---|
| AU | 2015201441 A1 | 10/2015 |
| CN | 101689327 B | 5/2013 |

(Continued)

OTHER PUBLICATIONS

Balaji et al., "Sentinel: Occupancy Based HVAC Actuation Using Existing WiFi Infrastructure Within Commercial Buildings," SenSys '13, 14 pages, Nov. 11-15, 2015.

(Continued)

*Primary Examiner* — Vincent H Tran
(74) *Attorney, Agent, or Firm* — Husch Blackwell LLP

(57) ABSTRACT

A system and approach using geofencing events for controlling temperature in a building for comfort of a user upon his or her arrival to the building. A decision may be made when to use a direct trigger by an incoming geofencing event and when to use a time of arrival prediction casted by an outgoing geofencing event. One or more geofences may be placed optimally based on the trigger decision and other aspects related to commuting patterns of the user.

20 Claims, 15 Drawing Sheets

(56) References Cited

U.S. PATENT DOCUMENTS

| | | |
|---|---|---|
| 6,604,023 B1 | 8/2003 | Brown et al. |
| 6,665,613 B2 | 12/2003 | Duvall |
| 6,909,891 B2 | 6/2005 | Yamashita et al. |
| 6,990,335 B1 | 1/2006 | Shamoon et al. |
| 7,083,109 B2 | 8/2006 | Pouchak |
| 7,127,734 B1 | 10/2006 | Amit |
| 7,130,719 B2 | 10/2006 | Ehlers et al. |
| 7,155,305 B2 | 12/2006 | Hayes et al. |
| D535,573 S | 1/2007 | Barton et al. |
| 7,159,789 B2 | 1/2007 | Schwendinger et al. |
| 7,257,397 B2 | 8/2007 | Shamoon et al. |
| 7,327,250 B2 | 2/2008 | Harvey |
| 7,343,226 B2 | 3/2008 | Ehlers et al. |
| 7,385,500 B2 | 6/2008 | Irwin |
| D580,801 S | 11/2008 | Takach et al. |
| 7,451,017 B2 | 11/2008 | McNally |
| 7,510,126 B2 | 3/2009 | Rossi et al. |
| 7,571,865 B2 | 8/2009 | Nicodem et al. |
| 7,574,208 B2 | 8/2009 | Hanson et al. |
| 7,614,567 B2 | 11/2009 | Chapman, Jr. et al. |
| 7,636,604 B2 | 12/2009 | Bergman et al. |
| 7,668,532 B2 | 2/2010 | Shamoon et al. |
| 7,768,393 B2 | 8/2010 | Nigam |
| 7,801,646 B2 | 9/2010 | Amundson et al. |
| 7,812,274 B2 | 10/2010 | Dupont et al. |
| 7,839,275 B2 | 11/2010 | Spalink et al. |
| 7,904,608 B2 | 3/2011 | Price |
| 7,908,211 B1 | 3/2011 | Chen et al. |
| 7,949,615 B2 | 5/2011 | Ehlers et al. |
| 7,953,518 B2 | 5/2011 | Kansal et al. |
| 7,973,678 B2 | 7/2011 | Petricoin, Jr. et al. |
| 8,018,329 B2 | 9/2011 | Morgan et al. |
| 8,064,935 B2 | 11/2011 | Shamoon et al. |
| 8,065,342 B1 | 11/2011 | Borg et al. |
| 8,095,340 B2 | 1/2012 | Brown |
| 8,115,656 B2 | 2/2012 | Bevacqua et al. |
| 8,125,332 B2 | 2/2012 | Curran et al. |
| 8,126,685 B2 | 2/2012 | Nasle |
| 8,131,401 B2 | 3/2012 | Nasle |
| 8,135,413 B2 | 3/2012 | Dupray |
| 8,140,279 B2 | 3/2012 | Subbloie |
| 8,150,421 B2 | 4/2012 | Ward et al. |
| 8,180,492 B2 | 5/2012 | Steinberg |
| 8,195,313 B1 | 6/2012 | Fadell et al. |
| 8,205,244 B2 | 6/2012 | Nightingale et al. |
| 8,219,114 B2 | 7/2012 | Larsen |
| 8,229,722 B2 | 7/2012 | Nasle |
| 8,229,772 B2 | 7/2012 | Tran et al. |
| 8,232,877 B2 | 7/2012 | Husain |
| 8,255,090 B2 | 8/2012 | Frader-Thompson et al. |
| 8,269,620 B2 | 9/2012 | Bullemer et al. |
| 8,280,536 B1 | 10/2012 | Fadell et al. |
| 8,301,765 B2 | 10/2012 | Goodman |
| 8,305,935 B2 | 11/2012 | Wang |
| 8,315,717 B2 | 11/2012 | Forbes, Jr. et al. |
| 8,332,055 B2 | 12/2012 | Veillette |
| 8,334,906 B2 | 12/2012 | Lipton et al. |
| 8,350,697 B2 | 1/2013 | Trundle et al. |
| 8,386,082 B2 | 2/2013 | Oswald |
| 8,390,473 B2 | 3/2013 | Krzyzanowski et al. |
| 8,406,162 B2 | 3/2013 | Haupt et al. |
| 8,412,381 B2 | 4/2013 | Nikovski et al. |
| 8,412,654 B2 | 4/2013 | Montalvo |
| 8,428,867 B2 | 4/2013 | Ashley, Jr. et al. |
| 8,433,344 B1 | 4/2013 | Virga |
| 8,442,695 B2 | 5/2013 | Imes et al. |
| 8,457,797 B2 | 6/2013 | Imes et al. |
| 8,509,954 B2 | 8/2013 | Imes et al. |
| 8,510,241 B2 | 8/2013 | Seshan |
| 8,510,255 B2 | 8/2013 | Fadell et al. |
| 8,531,294 B2 | 9/2013 | Slavin et al. |
| 8,554,374 B2 | 10/2013 | Luncek et al. |
| 8,554,714 B2 | 10/2013 | Raymond et al. |
| 8,556,188 B2 | 10/2013 | Steinberg |
| 8,560,127 B2 | 10/2013 | Leen et al. |
| 8,571,518 B2 | 10/2013 | Imes et al. |
| 8,577,392 B1 | 11/2013 | Pai et al. |
| 8,587,445 B2 | 11/2013 | Rockwell |
| 8,606,374 B2 | 12/2013 | Fadell et al. |
| 8,620,841 B1 | 12/2013 | Filson et al. |
| 8,626,344 B2 | 1/2014 | Imes et al. |
| 8,630,741 B1 | 1/2014 | Matsuoka et al. |
| 8,634,796 B2 | 1/2014 | Johnson |
| 8,648,706 B2 | 2/2014 | Ranjun et al. |
| 8,666,558 B2 | 3/2014 | Wang et al. |
| 8,670,783 B2 | 3/2014 | Klein |
| 8,686,841 B2 | 4/2014 | Macheca et al. |
| 8,718,826 B2 | 5/2014 | Ramachandran et al. |
| 8,725,831 B2 | 5/2014 | Barbeau et al. |
| 8,798,804 B2 | 8/2014 | Besore et al. |
| 8,810,454 B2 | 8/2014 | Cosman |
| 8,812,024 B2 | 8/2014 | Obermeyer et al. |
| 8,812,027 B2 | 8/2014 | Obermeyer et al. |
| 8,840,033 B2 | 9/2014 | Steinberg |
| 8,868,254 B2 | 10/2014 | Louboutin |
| 8,874,129 B2 | 10/2014 | Forutanpour et al. |
| 8,886,178 B2 | 11/2014 | Chatterjee |
| 8,890,675 B2 | 11/2014 | Ranjan et al. |
| 8,909,256 B2 | 12/2014 | Fraccaroli |
| 8,918,219 B2 | 12/2014 | Sloo et al. |
| 8,941,489 B2 | 1/2015 | Sheshadri et al. |
| 8,965,401 B2 | 2/2015 | Sheshadri et al. |
| 8,965,406 B2 | 2/2015 | Henderson |
| 9,026,261 B2 | 5/2015 | Bukhin et al. |
| 9,033,255 B2 | 5/2015 | Tessier et al. |
| 9,055,475 B2 | 6/2015 | Lacatus et al. |
| 9,071,453 B2 | 6/2015 | Shoemaker et al. |
| 9,113,298 B2 | 8/2015 | Qiu |
| 9,167,381 B2 | 10/2015 | McDonald et al. |
| 9,168,927 B2 | 10/2015 | Louboutin |
| 9,183,530 B2 | 11/2015 | Schwarz et al. |
| 9,210,545 B2 | 12/2015 | Sabatelli et al. |
| 9,215,560 B1 | 12/2015 | Jernigan |
| 9,219,983 B2 | 12/2015 | Sheshadri et al. |
| 9,247,378 B2 | 1/2016 | Bisson et al. |
| 9,280,559 B1 | 3/2016 | Jones |
| 9,288,620 B2 | 3/2016 | Menendez |
| 9,292,022 B2 | 3/2016 | Ramachandran et al. |
| 9,363,638 B1 | 3/2016 | Jones |
| 9,307,344 B2 | 4/2016 | Rucker et al. |
| 9,311,685 B2 | 4/2016 | Harkey et al. |
| 9,313,320 B2 | 4/2016 | Zeilingold et al. |
| 9,363,636 B2 | 6/2016 | Ganesh et al. |
| 9,363,772 B2 | 6/2016 | Burks |
| 9,396,344 B1 | 7/2016 | Jones |
| 9,414,422 B2 | 8/2016 | Belghoul et al. |
| 9,432,807 B2 | 8/2016 | Kern, Jr. et al. |
| 9,433,681 B2 | 9/2016 | Constein et al. |
| 9,449,491 B2 | 9/2016 | Sager et al. |
| 9,477,239 B2 | 10/2016 | Bergman et al. |
| 9,491,577 B1 | 11/2016 | Jones |
| 9,495,866 B2 | 11/2016 | Roth et al. |
| 9,521,519 B2 | 12/2016 | Chiou et al. |
| 9,552,002 B2 | 1/2017 | Sloo et al. |
| 9,560,482 B1 | 1/2017 | Frenz |
| 9,589,435 B2 | 3/2017 | Finlow-Bates |
| 9,594,384 B2 | 3/2017 | Bergman et al. |
| 9,609,478 B2 | 3/2017 | Frenz et al. |
| 9,618,227 B2 | 4/2017 | Drew |
| 9,628,951 B1 | 4/2017 | Kolavennu et al. |
| 9,635,500 B1 | 4/2017 | Becker et al. |
| 9,645,589 B2 | 5/2017 | Leen et al. |
| 2002/0147006 A1 | 10/2002 | Coon et al. |
| 2004/0034484 A1 | 2/2004 | Solomita, Jr. et al. |
| 2005/0172056 A1 | 8/2005 | Ahn |
| 2006/0063522 A1 | 3/2006 | McFarland |
| 2006/0097063 A1 | 5/2006 | Zeevi |
| 2007/0037605 A1 | 2/2007 | Logan |
| 2007/0043478 A1 | 2/2007 | Ehlers et al. |
| 2007/0060171 A1 | 3/2007 | Sudit et al. |
| 2007/0099626 A1 | 5/2007 | Lawrence et al. |
| 2007/0114295 A1 | 5/2007 | Jenkins |
| 2007/0249319 A1 | 10/2007 | Faulkner et al. |
| 2008/0094230 A1 | 4/2008 | Mock et al. |

(56) References Cited

U.S. PATENT DOCUMENTS

| | | |
|---|---|---|
| 2008/0262820 A1 | 10/2008 | Nasle |
| 2009/0012704 A1 | 1/2009 | Franco et al. |
| 2009/0187499 A1 | 7/2009 | Mulder et al. |
| 2009/0240381 A1 | 9/2009 | Lane |
| 2009/0302994 A1 | 12/2009 | Rhee et al. |
| 2010/0034386 A1 | 2/2010 | Choong et al. |
| 2010/0042940 A1 | 2/2010 | Monday et al. |
| 2010/0081375 A1 | 4/2010 | Rosenblatt et al. |
| 2010/0127854 A1 | 5/2010 | Helvick et al. |
| 2010/0156628 A1 | 6/2010 | Ainsbury et al. |
| 2010/0261465 A1 | 10/2010 | Rhoads et al. |
| 2010/0289643 A1* | 11/2010 | Trundle ............... G08C 19/16 340/545.1 |
| 2011/0153525 A1 | 6/2011 | Benco et al. |
| 2011/0214060 A1 | 9/2011 | Imes et al. |
| 2012/0046859 A1* | 2/2012 | Imes ................... H02J 13/001 701/409 |
| 2012/0065802 A1 | 3/2012 | Seeber et al. |
| 2012/0172027 A1 | 7/2012 | Partheesh et al. |
| 2012/0191257 A1 | 7/2012 | Corcoran et al. |
| 2012/0209730 A1 | 8/2012 | Garrett |
| 2012/0259466 A1 | 10/2012 | Ray et al. |
| 2012/0284769 A1 | 11/2012 | Dixon et al. |
| 2013/0073094 A1 | 3/2013 | Knapton et al. |
| 2013/0204441 A1 | 8/2013 | Sloo et al. |
| 2013/0225196 A1 | 8/2013 | James et al. |
| 2013/0231137 A1 | 9/2013 | Hugie et al. |
| 2013/0267253 A1 | 10/2013 | Case et al. |
| 2013/0310053 A1 | 11/2013 | Srivastava et al. |
| 2013/0318217 A1 | 11/2013 | Imes et al. |
| 2013/0331087 A1 | 12/2013 | Shoemaker et al. |
| 2014/0031989 A1 | 1/2014 | Bergman et al. |
| 2014/0031991 A1 | 1/2014 | Bergman et al. |
| 2014/0100835 A1 | 4/2014 | Majumdar et al. |
| 2014/0156087 A1 | 6/2014 | Amundson |
| 2014/0164118 A1 | 6/2014 | Polachi |
| 2014/0172176 A1 | 6/2014 | Deilmann et al. |
| 2014/0200718 A1 | 7/2014 | Tessier |
| 2014/0244048 A1 | 8/2014 | Ramachandran et al. |
| 2014/0266635 A1 | 9/2014 | Roth et al. |
| 2014/0277762 A1 | 9/2014 | Drew |
| 2014/0302879 A1 | 10/2014 | Kim et al. |
| 2014/0330435 A1 | 11/2014 | Stoner et al. |
| 2014/0337123 A1 | 11/2014 | Nuernberg et al. |
| 2014/0349672 A1 | 11/2014 | Kem, Jr. et al. |
| 2014/0370911 A1 | 12/2014 | Gorgenyi et al. |
| 2015/0065161 A1 | 3/2015 | Ganesh et al. |
| 2015/0094860 A1 | 4/2015 | Finnerty et al. |
| 2015/0140994 A1 | 5/2015 | Partheesh et al. |
| 2015/0141045 A1 | 5/2015 | Qiu et al. |
| 2015/0150101 A1* | 5/2015 | Novack ............... G07C 9/00111 726/7 |
| 2015/0159895 A1 | 6/2015 | Quam et al. |
| 2015/0163631 A1 | 6/2015 | Quam et al. |
| 2015/0163945 A1 | 6/2015 | Barton et al. |
| 2015/0186497 A1 | 7/2015 | Patton et al. |
| 2015/0237470 A1 | 8/2015 | Mayor et al. |
| 2015/0271638 A1 | 9/2015 | Menayas et al. |
| 2015/0301543 A1 | 10/2015 | Janoso et al. |
| 2015/0309484 A1* | 10/2015 | Lyman ............... G05B 13/0205 700/275 |
| 2015/0338116 A1 | 11/2015 | Furuta et al. |
| 2015/0370272 A1 | 12/2015 | Reddy et al. |
| 2015/0372832 A1 | 12/2015 | Kortz et al. |
| 2016/0007156 A1 | 1/2016 | Chiou et al. |
| 2016/0018122 A1 | 1/2016 | Frank et al. |
| 2016/0018832 A1* | 1/2016 | Frank ................... H04W 4/021 700/276 |
| 2016/0054865 A1 | 2/2016 | Kerr et al. |
| 2016/0057572 A1 | 2/2016 | Bojorquez Alfaro et al. |
| 2016/0142872 A1 | 5/2016 | Nicholson et al. |
| 2016/0189526 A1* | 6/2016 | Kennedy ............... G08B 13/08 340/541 |
| 2016/0223998 A1* | 8/2016 | Songkakul ............ G05B 15/02 |
| 2016/0246353 A1* | 8/2016 | Bostick ................ G06F 1/3231 |
| 2016/0261424 A1 | 9/2016 | Gamberini |
| 2016/0286033 A1 | 9/2016 | Frenz et al. |
| 2016/0313749 A1* | 10/2016 | Frenz .................. G05B 19/106 |
| 2016/0313750 A1 | 10/2016 | Frenz et al. |
| 2017/0026506 A1 | 1/2017 | Haepp et al. |
| 2017/0130979 A1 | 5/2017 | Kolavennu et al. |
| 2017/0134214 A1 | 5/2017 | Sethuraman et al. |
| 2017/0171704 A1 | 6/2017 | Frenz |

FOREIGN PATENT DOCUMENTS

| | | |
|---|---|---|
| CN | 103175287 A | 6/2013 |
| CN | 104704863 A | 6/2015 |
| CN | 105318499 A | 2/2016 |
| DE | 102013226390 A1 | 6/2015 |
| EP | 1515289 A1 | 3/2005 |
| EP | 2607802 EP | 6/2013 |
| EP | 2675195 A2 | 12/2013 |
| EP | 3001116 A1 | 3/2016 |
| JP | 2011203841 A | 10/2011 |
| JP | 2012109680 A | 6/2012 |
| MX | 2012000906 A | 9/2012 |
| WO | 2006055334 A1 | 5/2006 |
| WO | 2009034720 A1 | 3/2009 |
| WO | 2009036764 A2 | 3/2009 |
| WO | 2009067251 A1 | 5/2009 |
| WO | 2011011404 A1 | 1/2011 |
| WO | 2011121299 A1 | 10/2011 |
| WO | 2012000107 A1 | 1/2012 |
| WO | 2012068517 A1 | 5/2012 |
| WO | 2013170791 A1 | 11/2013 |
| WO | 2014016705 A2 | 1/2014 |
| WO | 2014047501 A1 | 3/2014 |
| WO | 2014055939 A1 | 4/2014 |
| WO | 2014144323 A1 | 9/2014 |
| WO | 2014197320 A1 | 12/2014 |
| WO | 2014200524 A2 | 12/2014 |
| WO | 2015047739 A1 | 4/2015 |
| WO | 2015089116 A1 | 6/2015 |
| WO | 2015164400 A1 | 10/2015 |

OTHER PUBLICATIONS

"Petition for Inter Partes Review of U.S. Pat. No. 8,571,518 Pursuant to 35 U.S.C. 311-319, 37 CFR 42," Inventor Imes et al., dated Oct. 29, 2014.

The Extended European Search Report for EP Application No. 1619416, dated Feb. 2, 2017.

U.S. Appl. No. 15/048,902, filed Feb. 19, 2016.

Do, "Programmable Communicating Thermostats for Demand Response in California," DR ETD Workshop, 26 pages, Jun. 11, 2007.

Green, "PM's Thermostat Guide," Popular Mechanics, pp. 155-158, Oct. 1985.

Gupta et al., "Adding GPS-Control to Traditional Thermostats: An Exploration of Potential Energy Savings and Design Challenges," Pervasive, LNCS 5538, pp. 95-114, 2009.

Gupta, "A Persuasive GPS-Controlled Thermostat System," 89 pages, Sep. 2008.

http://community.lockitron.com/notifications-geofencing-scheduling-sense-bluetooth/633, "Lockitron Community, Notifications, Geofencing, Scheduling, Sense/Bluetooth," 14 pages, printed Oct. 29, 2014.

http://stackoverflow.com/questions/14232712/tracking-multiple-20-locations-with-ios-geofencing, "Tracking Multiple (20+) Locations with iOS Geofencing—Stack Overflow," 2 pages, printed Oct. 29, 2014.

http://www.allure-energy.com/aenf_jan9_12.html, "CES Gets First Look at EverSense," Allure Energy, 2 pages, printed Feb. 17, 2015.

http://IWww.prnev.tswire.com/nev.ts-releases/allure-energy-unveils-a-combination-of-ibeacon-and-nfc-enabled-smart-sensor-technology-known-as-aura-23885 . . . , "Allure Energy Unveils a Combination of iBeacon and NFC Enabled Smart Sensor Technology Known as Aura," 6 pages, Jan. 6, 2014.

Mobile Integrated Solutions, LLC, "MobiLinc Take Control of Your Home, MobiLinc and Geo-Fence Awareness," 9 pages, downloaded Mar. 27, 2015.

(56) References Cited

OTHER PUBLICATIONS

Pan et al., "A Framework for Smart Location-Based Automated Energy Controls in a Green Building Testbed," 6 pages, downloaded Jan. 30, 2015.
SmartThings Inc., "2 Ecobee Si Thermostat + Geofencing," 17 pages, downloaded Nov. 3, 2014.
The Extended European Search Report for EP Application No. 16195639.6, dated May 31, 2017.
The Extended European Search Report for EP Application No. 16156760.7-1862, dated Jul. 8, 2016.
The Extended European Search Report for EP Application No. 16196128.9 dated Mar. 7, 2017.
Gentec, "Feature Focus, Threat Level Management," 2 pages, 2013.
Allure Energy, "Our Technology," http://www.allure-energy.com/pages/about.jsp 1 page, printed May 30, 2012.
The International Search Report for PCT Application No. PCT/US2010/042589 dated Nov. 22, 2010.
Mozer, "The Neural Network House: An Environment that Adapts to Its Inhabitants," Department of Computer Science, University of Colorado, 5 pages, downloaded May 29, 2012.
Scanlon et al., "Mutual Information Based Visual Feature Selection for Lipreading," 8th International Conference on Spoken Language Processing, 5 pages, Oct. 4-8, 2004.
Transportation Research Board of the National Academies, "Commuting in America III, the Third National Report on Commuting Patterns and Trends," 199 pages, 2006.

\* cited by examiner

FIG. 14

$$P(T_{away}|T,D) = \sum_{t \in [T-1.5h, T+1.5h]} P(t|T) * P(T_{away}|T,D) =$$

$$0.01 * P(T_{away}|T-1.5h, D) + 0.09 * P(T_{away}|T-1h, D) +$$

$$0.2 * P(T_{away}|T-0.5h, D) + 0.4 * P(T_{away}|T, D) +$$

$$0.2 * P(T_{away}|T+0.5h, D) + 0.09 * P(T_{away}|T+1h, D)$$

$$+ 0.01 * P(T_{away}|T+1.5h, D)$$

1

GEOFENCING FOR THERMOSTATIC CONTROL

BACKGROUND

The present disclosure pertains to geofencing, and predicting behavior at least partially based on geofencing results.

SUMMARY

The disclosure reveals a system and approach using geofencing events for controlling temperature in a building for comfort of a user upon his or her arrival to the building. A decision may be made when to use a direct trigger by an incoming geofencing event and when to use a time of arrival prediction casted by an outgoing geofencing event. One or more geofences may be placed optimally based on the trigger decision and other aspects related to commuting patterns of the user.

BRIEF DESCRIPTION OF THE DRAWING

FIG. 14 is a diagram showing a formula relating to time away.

DESCRIPTION

Figure 1:
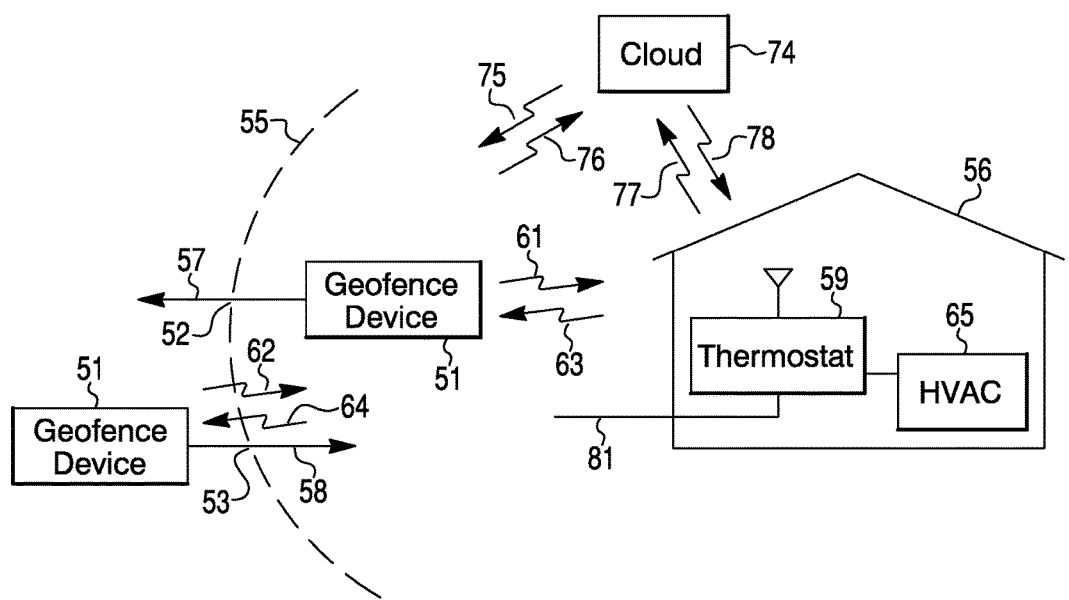
FIG. 1 is a diagram of a geofence device in a context of a geofence and a building.

The present system and approach may incorporate one or more processors, computers, controllers, user interfaces, wireless and/or wire connections, and/or the like, in an implementation described and/or shown herein.

This description may provide one or more illustrative and specific examples or ways of implementing the present system and approach. There may be numerous other examples or ways of implementing the system and approach.

Aspects of the system or approach may be described in terms of symbols in the drawing. Symbols may have virtually any shape (e.g., a block) and may designate hardware, objects, components, activities, states, steps, procedures, and other items.

Geofencing capability may be used in location aware systems to automatically alter a system's behavior based on a user's proximity. For example, a home's A/C may start cooling upon an event of a geo-fence crossing by the home occupant (i.e., the event being detected by the localization enabled mobile application on the user's smartphone).

One of the associated issues is that typical commuting time does not provide enough time to cool or heat the house to a desired comfort level; therefore, any geofencing-controlled heating or cooling of a home will not necessarily achieve its objectives. Studies may show that many commuter's arrivals are to an uncomfortable house. Further, in very hot or very cold climates, such as in desert areas or northern central areas, respectively, the level of discomfort caused by the geofencing-controlled heating or cooling may be very large. This issue may be addressed by a probabilistic model based prediction of user's behavior patterns. The probabilistic models of a user's behavior patterns may be built using the records of events related to the user's behavior patterns such as a user's departure and arrival times (acquired using a geofencing application). The models are then used to predict, e.g., the user's next arrival based on the most recent departure time and other contextual information such as day of week, time of year, weather, and so on.

However, an issue of a probabilistic model is that it may rely on statistics calculated on available data which might require a sufficient amount of historical data. In practice, many situations occur when there are not sufficient data available for a user and consequently the probabilistic model cannot be built with insufficient data since it could be highly unreliable. Such situations typically occur when a new user installs or initiates the geofencing-based product or service or when the user significantly changes his or her behavior patterns. In particular, the new user situation may constitute a significant issue for a product/service acceptance as it corresponds to a time when the first user's impressions of the product/service are created and a user's reviews are posted.

A present approach may incorporate a solution to the issue of insufficient data for a geofencing-based product or service with a probabilistic model based prediction.

The solution may have the following features. A "data collection mechanism" may be established that records the geofencing events together with a user's identifier allowing storage of geofencing events in a common backend database so that each geofencing event is associated with a unique identification of the user who created the geofencing event.

The Figures relative to the present disclosure may be noted. FIG. 1 is a diagram revealing a geofence device 51 crossing a geofence 55 with an occurrence of an event 52 of the crossing. Device 51 may be noted as leaving a house 56 as indicated by a direction arrow 57. A return of device 51 is shown toward house 56 with an occurrence of an event 53 of the crossing at geofence 55 as indicated by a direction arrow 58. Occurrences of events 52 and 53 may be sent wirelessly as signals 61 and 62, respectively, to a thermostat 59 which has a processor to calculate estimates of future arrivals so that thermostat 59 can control the heating, ventilation and cooling (HVAC) 65 to achieve a preset temperature at a time that geofence device 51 arrives at the house. Of course, the temperature of the house is achieved for a person that is carrying device 51. Signals 63 and 64, in certain circumstances and/or for particular reasons, may be sent by thermostat 59 to device 51. A computational mechanism may in the cloud 74, a processor embedded in thermostat 59, or a processor embedded in geofence device 51. Communication may be wireless signals 75-78 or by a cable 81 among thermostat 59, geofence device 51 and cloud 74. A connection between the HVAC system 65 and thermostat 59 may be wire or wireless.

Figure 2A:
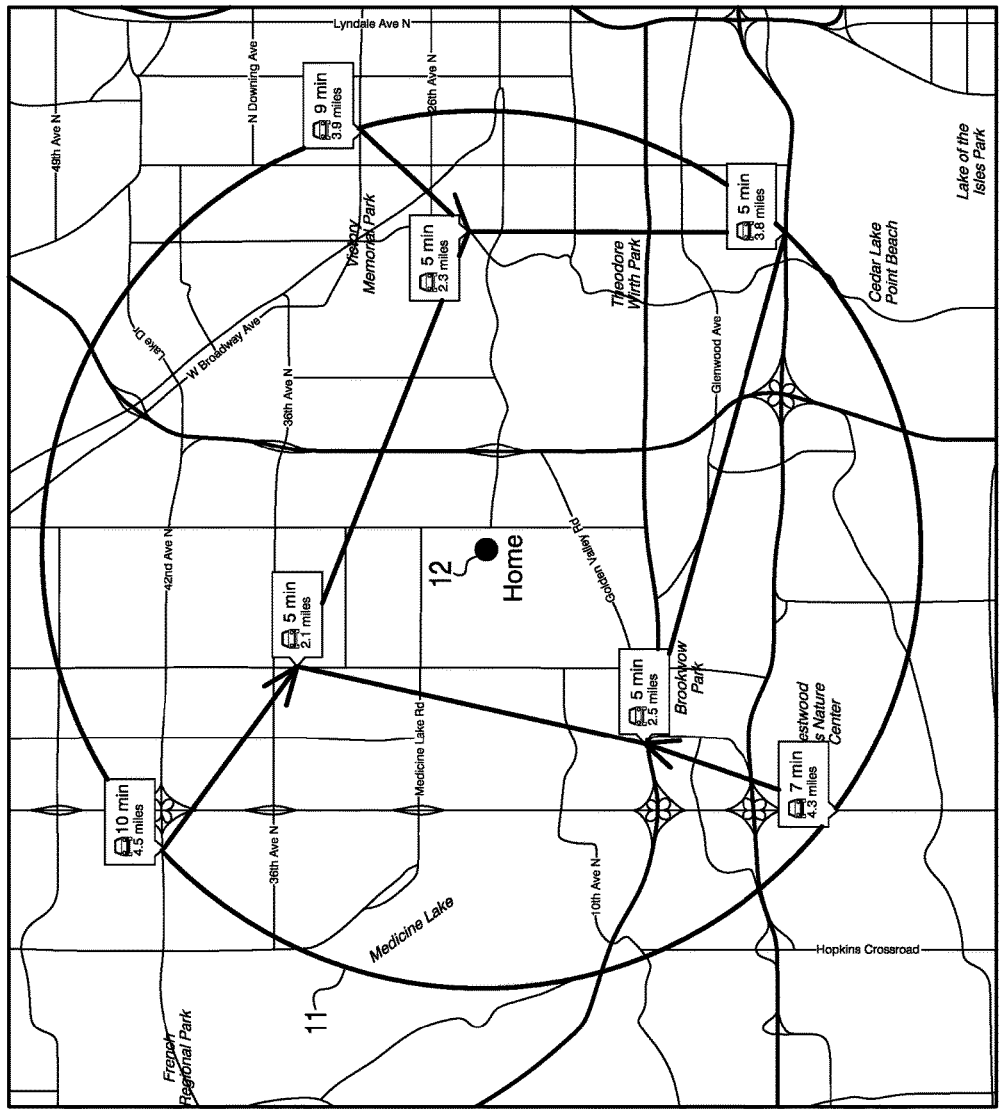
FIG. 2a is a diagram of a distance-based geofence and simplified time-based geofence using the map.

FIG. 2a is a diagram of an example fixed-distance geofence (circle 11) around a central geolocation (point 12) such as a home. A geofencing service may be indicated, where the geofence is defined temporally, by the fixed time of arrival from the geofence to the central geolocation. Using a navigation algorithm, it is possible to estimate a time to arrive from the border to the central point. While it is potentially applicable for many points on the border; in the attached illustration, four points are used. The time to arrive may span from five to ten minutes.

For instance, one may set the time of arrival after crossing the geofence to five minutes. One may need to move three of the four points closer to the central location. An approach of calculating the time-based geofence may be parametrized in several ways. It may use a type of travel as an input (car, bicycle, or walking), which may affect not only the average speed of movement, but also constraints of movement (e.g., only a car is allowed on the highway). Also, the geofence may be adjusted in real time taking into account current traffic (accidents, traffic jams, and so forth).

An alternative way to calculate the time-based geofence may be, instead of keeping track of the perimeter, to monitor or estimate a user's current geolocation and continuously estimate the user's time of arrival (ETA) to the geofence's geolocation. The geofence may be then triggered when the ETA becomes equal or smaller than a fixed time of arrival defining the temporal geofence. The ETA may be estimated using a known or estimated speed and a nature of the user's movement (walking, cycling, or driving), a user's planned route and a user's estimated speed along the route, just like in a case of common navigation. Further, the ETA estimate may use information of the user's behavior patterns. The user's behavior patterns may be learned from an analysis of the records of a user's movement (e.g., by building probabilistic models describing the timing, the frequency, the position, the length and other aspects of user's frequent activities such as commuting to work, regular shopping, and so forth). Alternatively, the user's behavior patterns may be directly provided by the user (e.g., by sharing the user's calendar or by entering the user's usual activities through a dedicated graphical user interface (GUI)).

A use may be with a connected, geofencing controlled thermostat, where, for an optimal result (i.e., achieving a user's comfort upon the user's arrival at the lowest cost), the fixed time of arrival defining the temporal geofence may correspond to a time needed to achieve an optimal comfort state in the zones controlled by the thermostat. This parameter may be either constant or dynamic, based on the current state of the zone and the current weather (e.g., as it may take longer time to cool the house in a very hot weather than in moderate weather conditions). The present approach may benefit any other geofencing controlled service or system that needs a setup time (e.g., water warming, cooking/baking, washing, drink cooling, or the like).

Figure 2B:
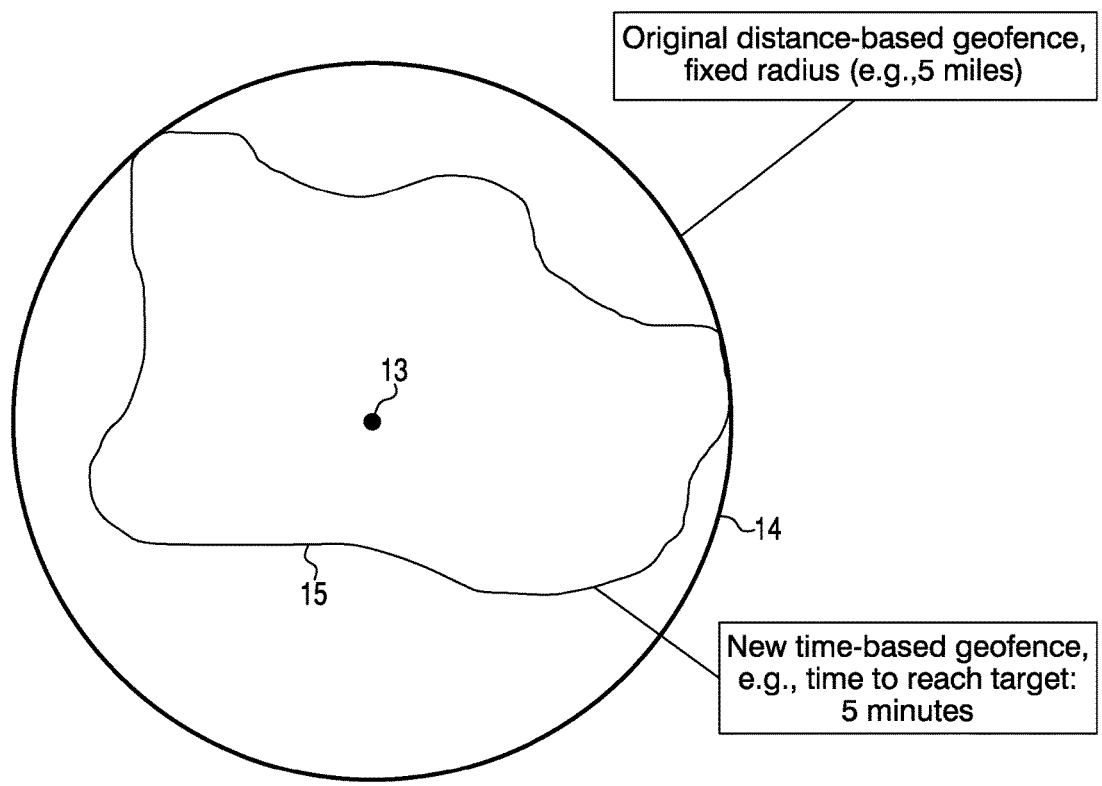
FIG. 2b is a schematic representation of distance-based geofence and full time-based geofence

FIG. 2b is a diagram of a target location (e.g., home) 13 with an original distance-based geofence 14 having a fixed radius (e.g., 5 miles) from location 13. Also, a time-based geofence 15 (e.g., 5 minutes to reach location 13) is shown, this time for the whole perimeter (i.e., each point on the time-based geofence boundary represents the 5 minutes to reach the location).

Figure 3:
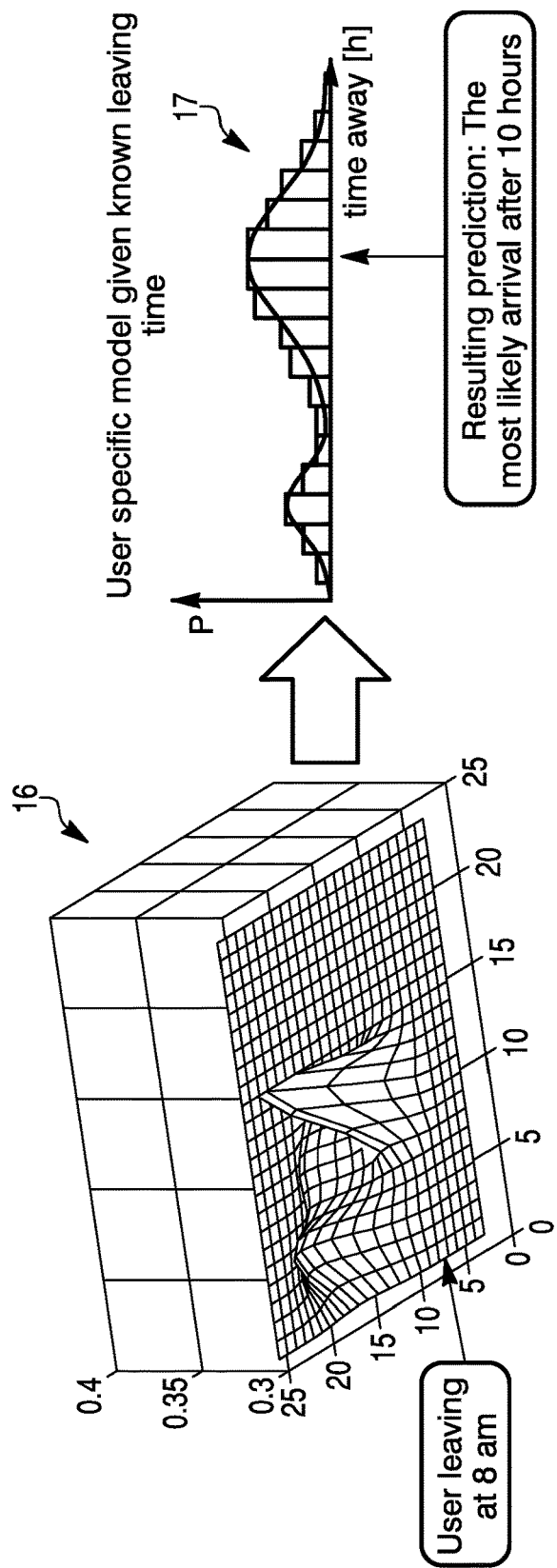
FIG. 3 is a diagram of a user specific model.

FIG. 3 is a diagram of a user specific model. A graph 16 shows a probability of time away as a function when leaving home. In this situation, the user is leaving at 8 AM. A graph 17 shows a time away in terms of hours versus probability. Graph 17 shows the user specific model given a known leaving time. In this example, a resulting prediction of the most likely arrival is after 10 hours.

Figure 4:
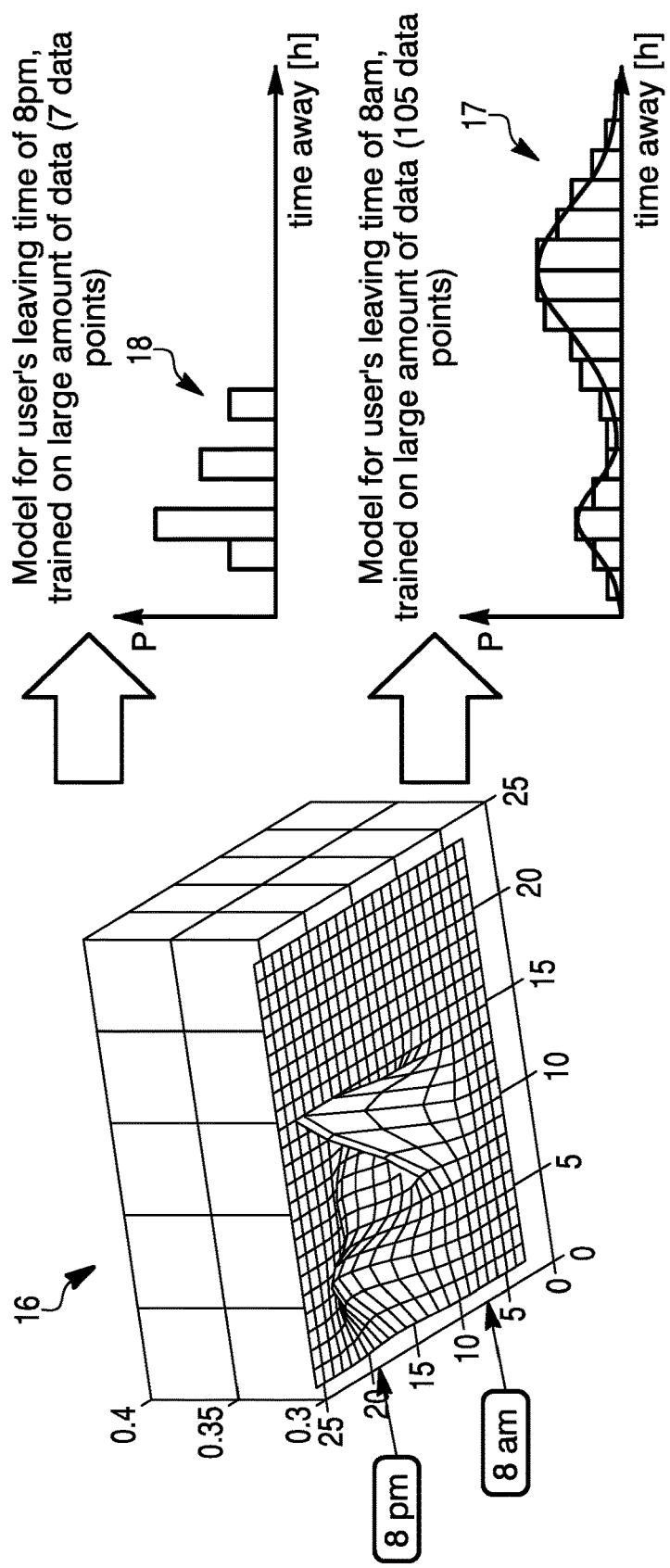
FIG. 4 is a diagram of small and larger amounts of data of the user specific model.

FIG. 4 is a diagram of the example of the user specific model in graph 16. Graph 18 shows a model for a user's leaving time of 8 AM, trained on a low amount of data (i.e., 7 data points). In comparison, graph 17 of a model for a user's leaving time of 8 AM, is trained on a large amount of data (105 data points).

Figure 5:
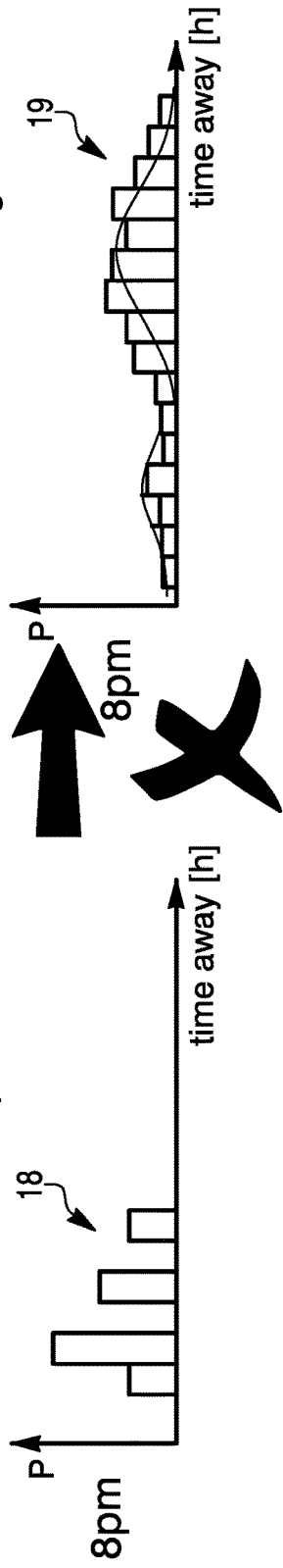
FIG. 5 is a diagram contrasting small and large amounts of data points for casting predictions.
Figure 5:
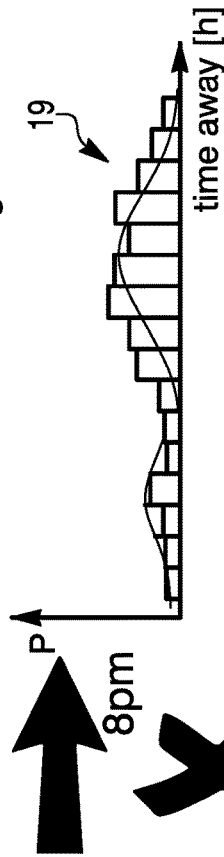
Figure 5:
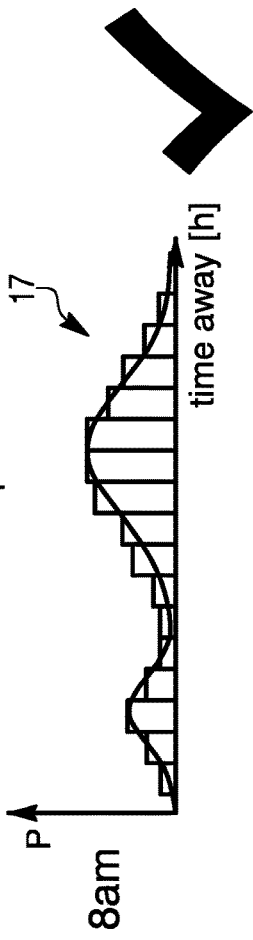

FIG. 5 is a diagram of a graph 18 with too few data points, resulting in a statistical model that is not necessarily valid and thus should not be used to cast predictions for a user's leaving time of 8 AM. The model of graph 18 may be replaced with a graph 19 of an equivalent model trained from data of a large amount of available user, that may be regarded as a background model. A model with a large number of data points (like graph 17 of FIG. 5) may be a statistical model that is valid and can be used to cast predictions.

Figure 6:
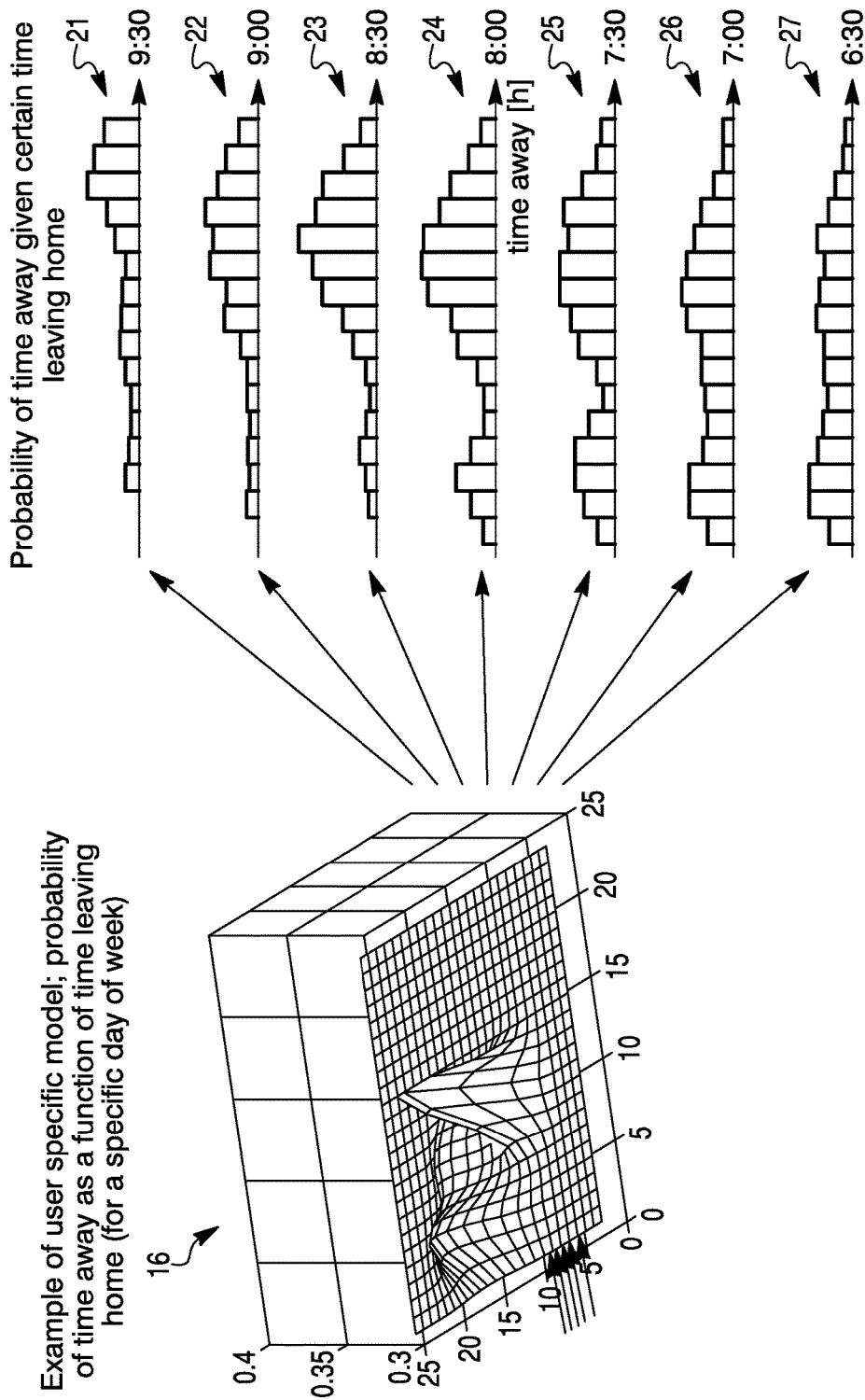
FIG. 6 is a diagram of time away from home as a function of when leaving home.

FIG. 6 is a diagram of graph 16 of the example of the user specific model showing a probability of time away as a function of time leaving home (for a specific day of the week). Graphs 21-27 show a probability of time away given a certain time for leaving home at 9:30 AM, 9:00 AM, 8:30 AM, 8:00 AM, 7:30 AM, 7:00 AM and 6:30 AM, respectively.

Figure 7:
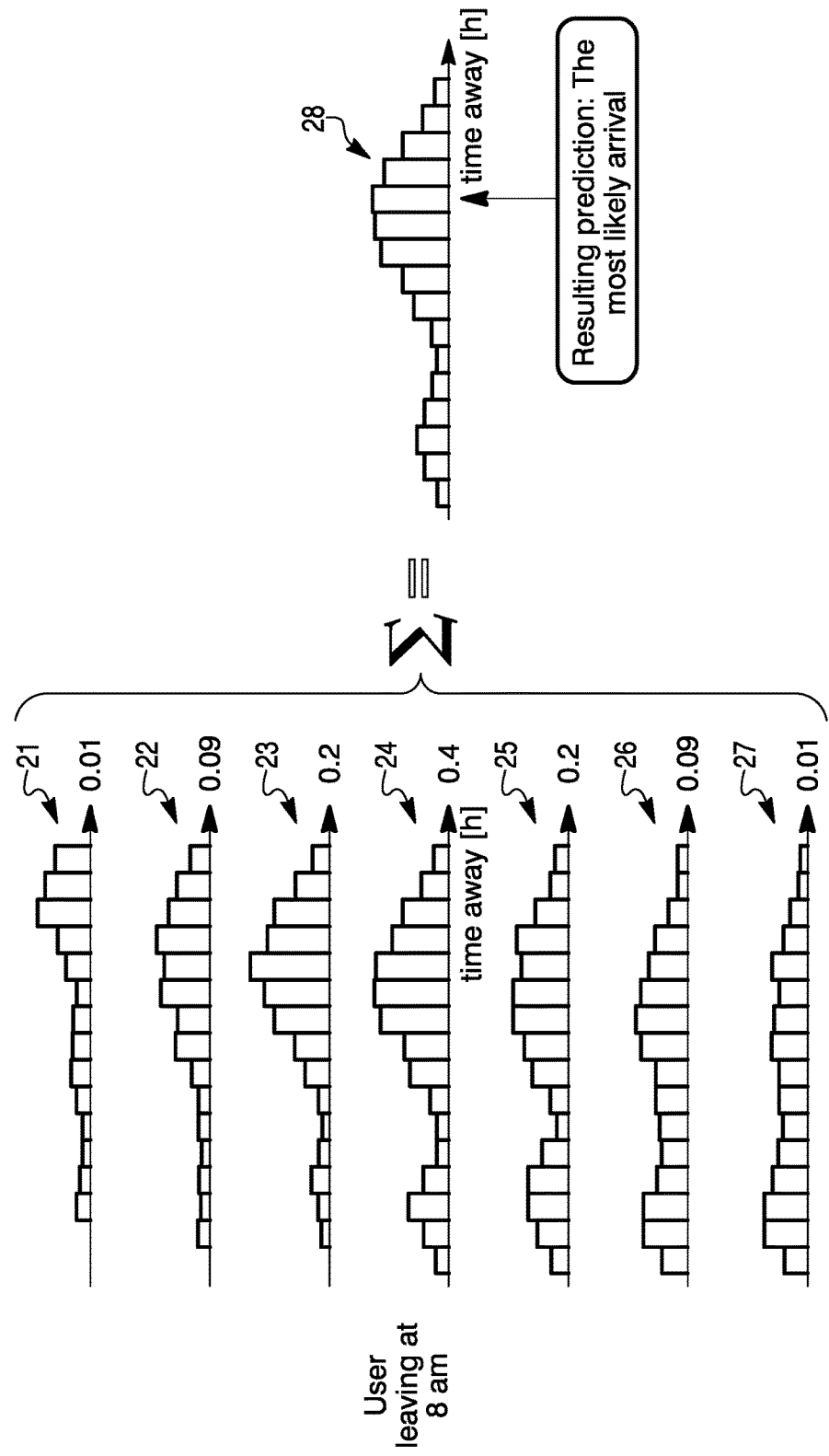
FIG. 7 is a diagram of probabilities relative to times of leaving home for predicting a time of arrival time at home.

FIG. 7 is a diagram of graphs 21-27 with their probabilities of time of leaving home in a summation, resulting prediction in a graph 28 and with an indication of the most likely arrival time of the user returning home.

Figure 8:
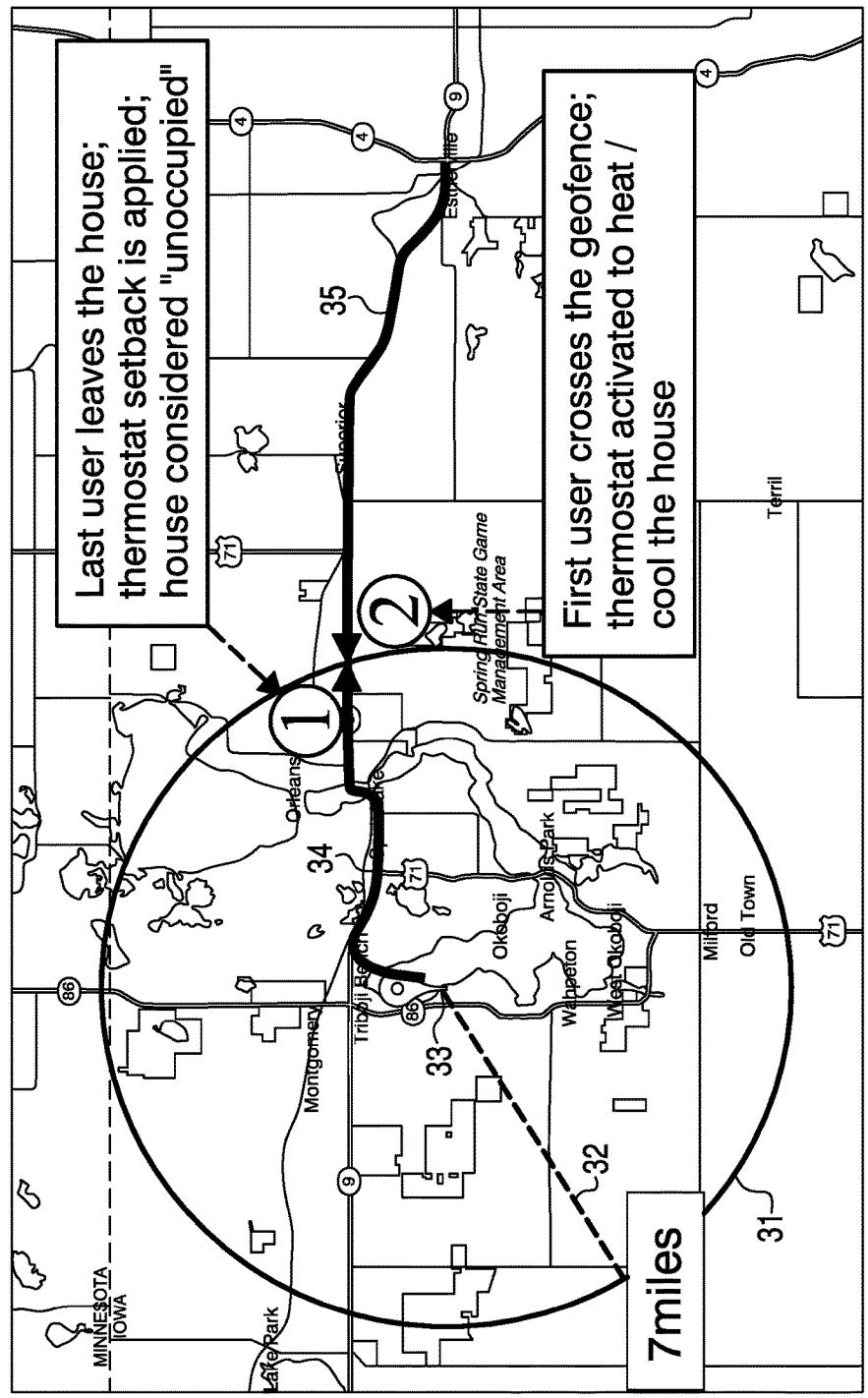
FIG. 8 is a diagram of a direct trigger geofencing thermostat control.

FIG. 8 is a diagram of a direct trigger geofencing thermostat control. A circle may represent a geofence 31 having a radius 32 of 7 miles. A user may leave a house at location 33 and travel a route 34 in a direction of geofence 31. As the user has left the house, a thermostat setback is applied as the house became considered as unoccupied. A user may be going along a route 35, and as the user crosses the geofence 31, the thermostat for the house at location 33 may be activated to heat or cool the house.

Figure 9:
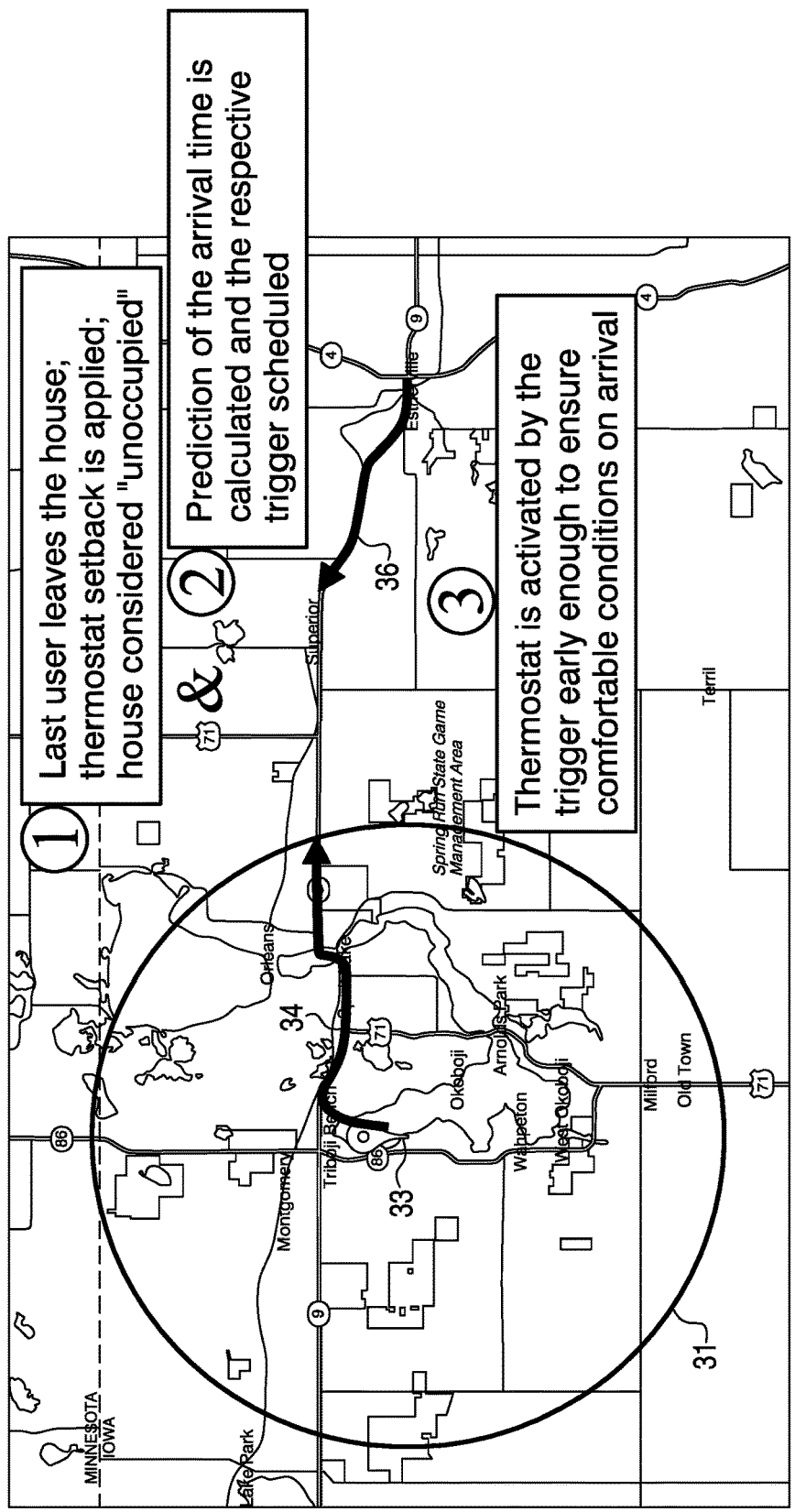
FIG. 9 is a diagram of a prediction basis for geofencing thermostat control.

FIG. 9 is a diagram of prediction based geofencing thermostat control. As in the FIG. 8, as the user left the house along route 34 towards geofence 31, the thermostat setback was applied since the house was considered unoccupied. Upon the user leaving the house at location 33, a prediction of arrival time may be calculated and a respective trigger scheduled for the thermostat, which may be activated by the trigger early enough (before the user crosses the geofence on the way back) to ensure comfortable conditions upon arrival for the user traveling along a route 36.

Figure 10:
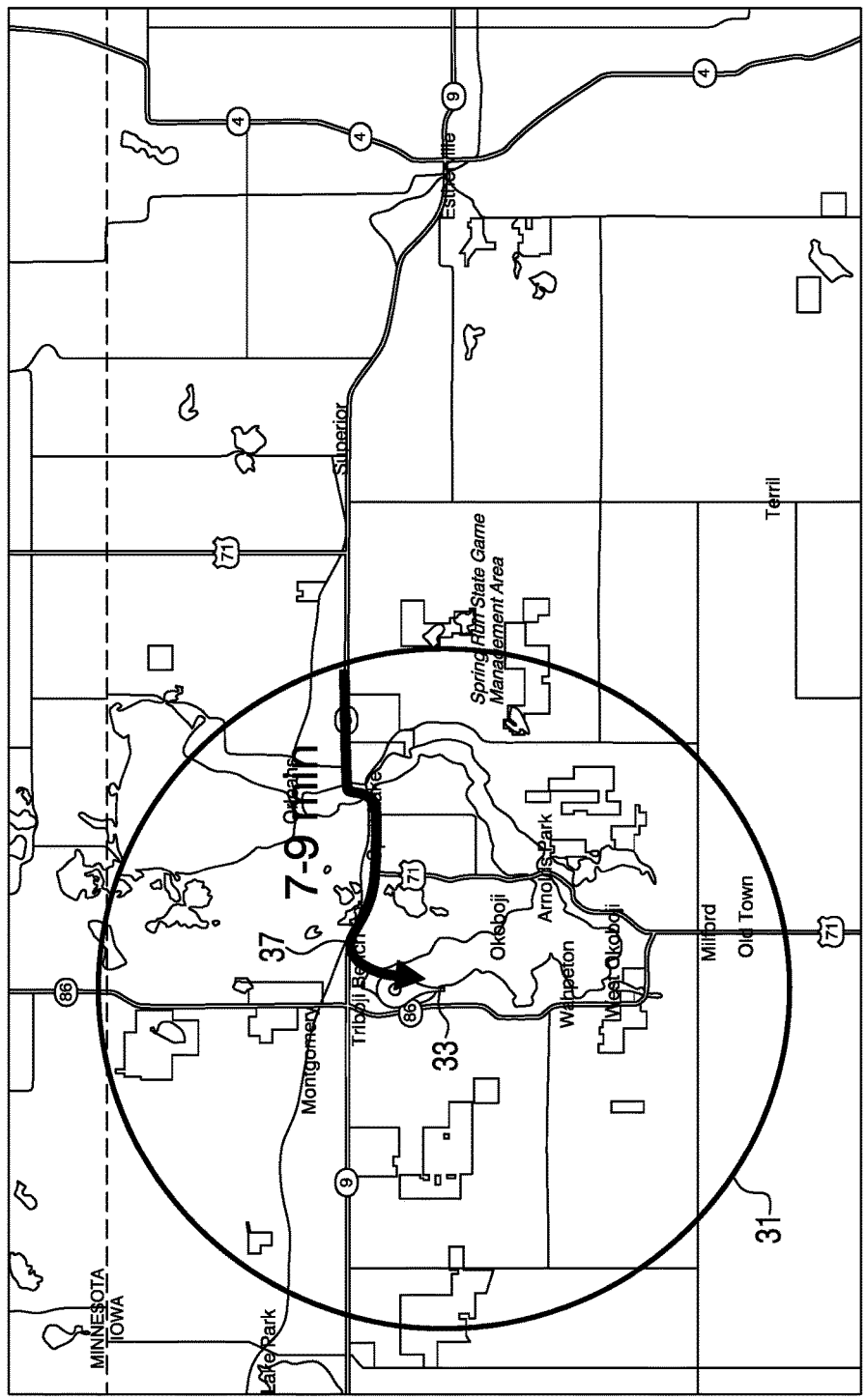
FIG. 10 is a diagram of time relative to return travel.

FIG. 10 is a diagram of geofence 31 with a user returning along a route 37 to the house at location 33. A duration of time for the user to travel between a crossing at geofence 31 to location 33 of house for arrival may be sufficient to ramp-up the heating or cooling the house in mild weather, such as spring or fall, but may be much less that sufficient for cold or hot weather, hence the direct geofencing control is not necessarily sufficient and comfort may be achieved with prediction based geofencing control.

Figure 11:
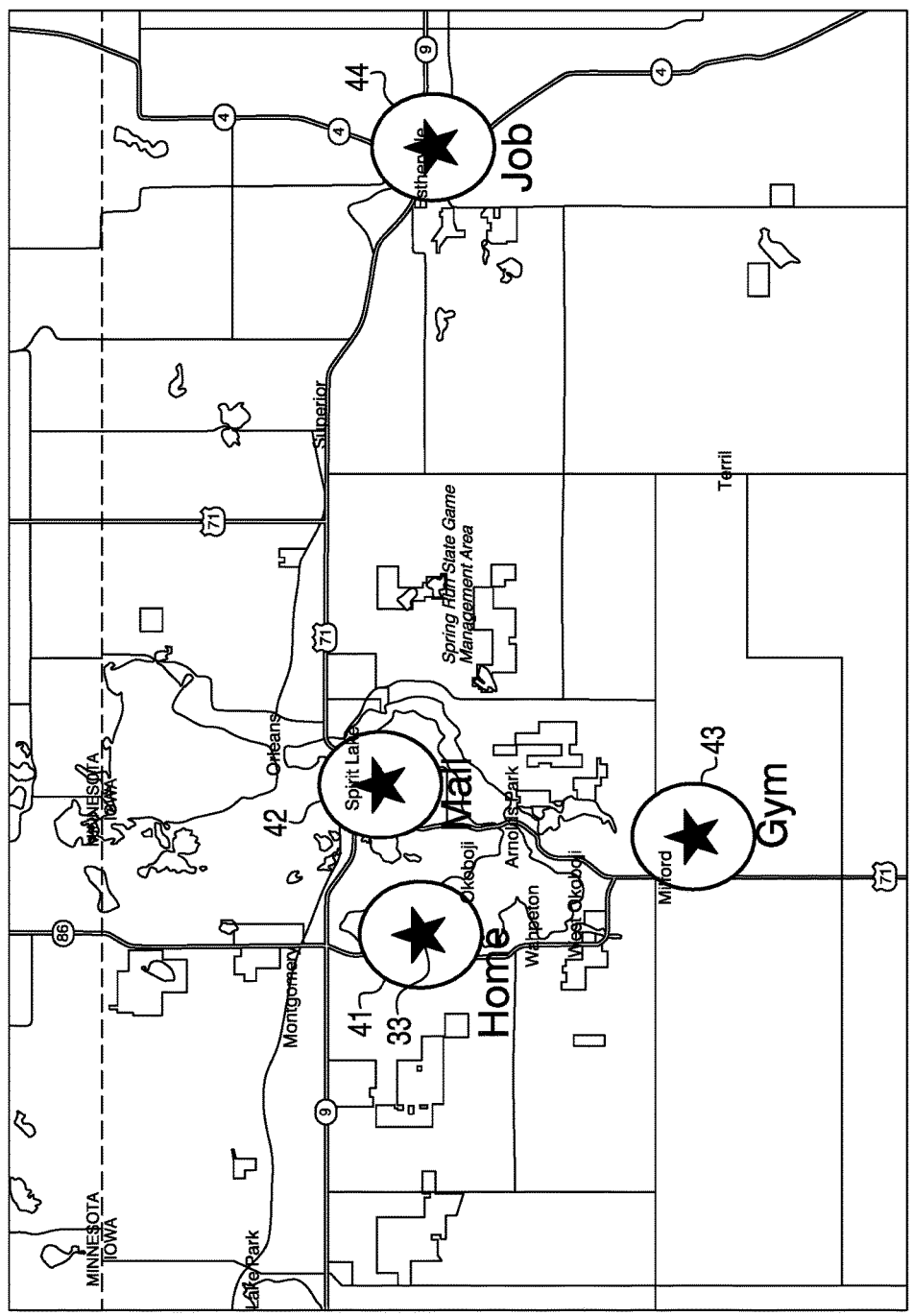
FIG. 11 is a diagram of geofences around places of frequent activity of a user.

FIG. 11 is a diagram of a situation when a prediction based geofence trigger is used. In this case, geofences 41, 42, 43 and 44 may be place around places of frequent activity, such as the home, mall, gym and the job, respectively, that may provide an additional advantage of better predictability about a user's next move, allowing an achievement of optimal control.

Figure 12:
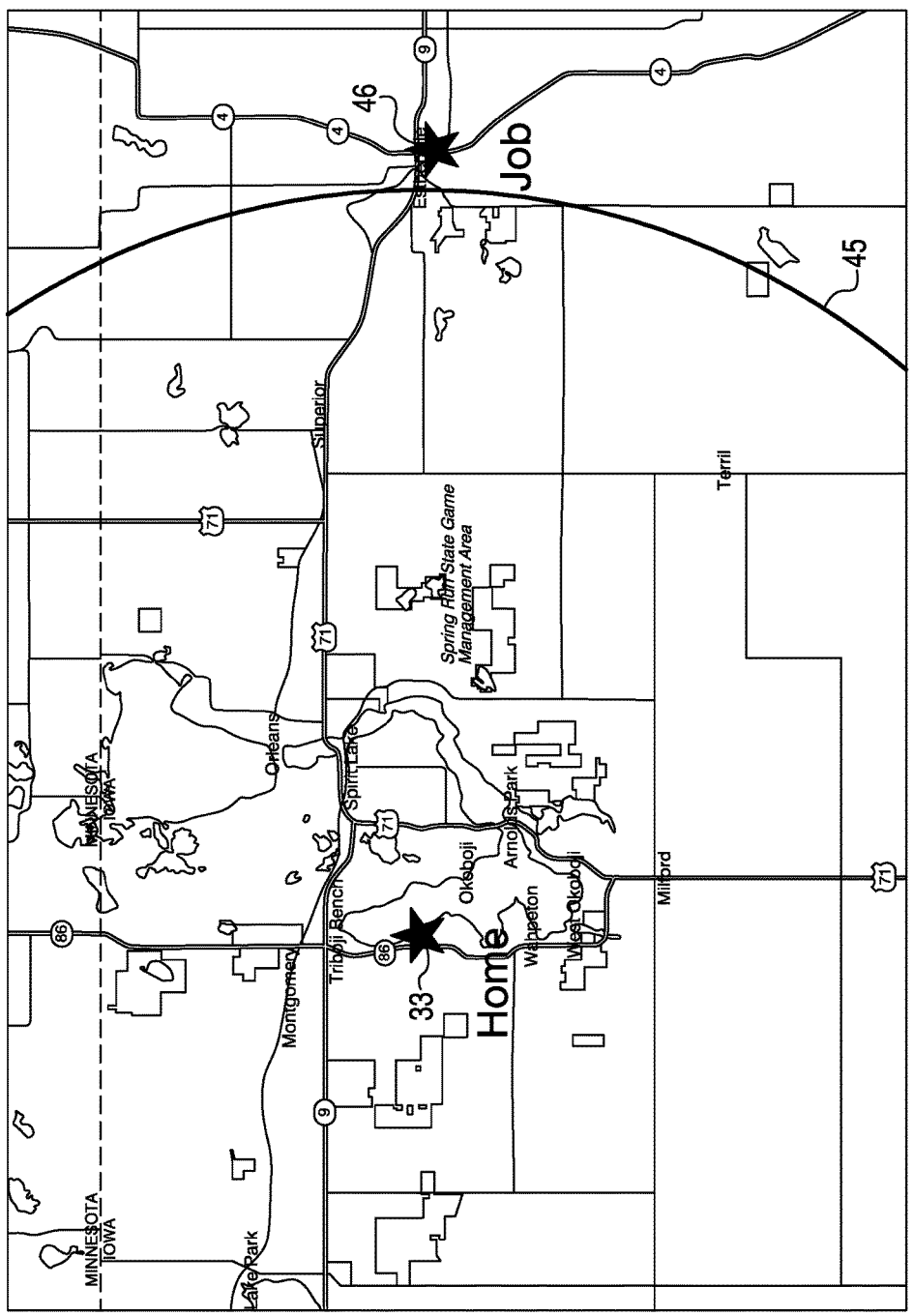
FIG. 12 is a diagram of direct trigger geofencing used where ramp-up time of a heating and cooling system is a factor.

FIG. 12 is a diagram of a situation when direct trigger geofencing is used. A geofence 45 may be placed according to ramp-up time of a heating and cooling system needed to provide a user, from a job location 46, the comfort of the house at location 33.

Figure 13:
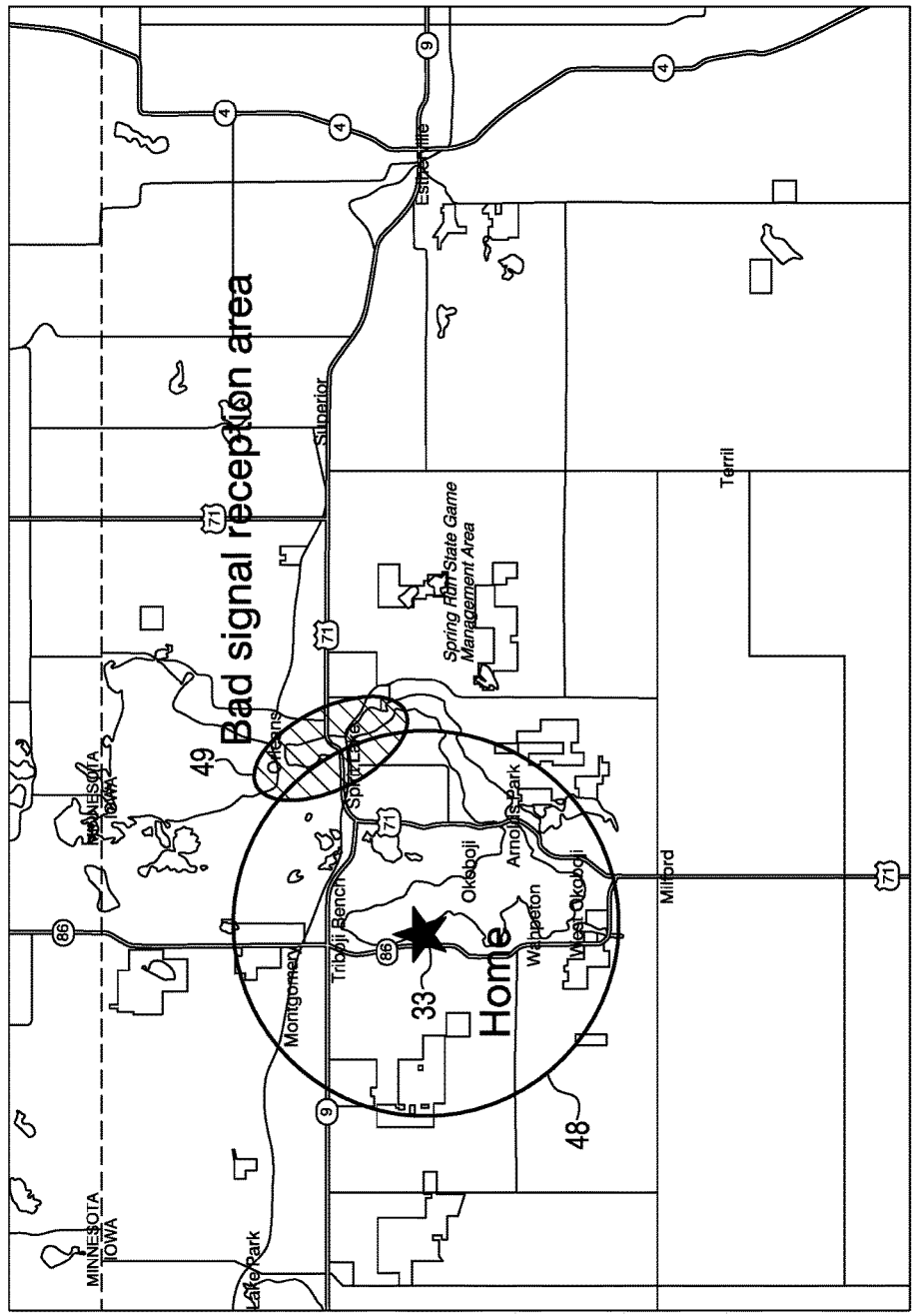
FIG. 13 is a diagram emphasizing proper placement of localization devices to avoid poor signal reception.

FIG. 13 is a diagram indicating that a placement of, for example, a geofence 48 that passes near an area 49 with poor GSM/GPS signal reception should be avoided to minimize a probability of missed or false geofencing crossing events.

A "user specific model" may be a probabilistic model of behavior patterns of a specific user, e.g., consisting of a joint probability density function (jpdf) of the time of the user's leaving the home (i.e., time of the leaving geofence crossing event) vs. the time of the user's arriving back home (i.e., time of the arriving geofence crossing event) vs. the day of the week. The "user specific model" may be built from the data records previously collected and stored using the "data collection mechanism" so that all or a part of the data records associated with a specific user may be used to build a probability density function (pdf). Other examples of the probabilistic model may include joint histograms, local data density, stored data points, and so forth.

A "prediction algorithm" may use the "user specific model" to predict a user's behavior patterns such as the time of the user's arriving back home (i.e., time of the arriving geofence crossing event) based on a known time of the user's leaving the home (i.e., time of the leaving geofence crossing event) and the actual day of the week. The algorithms may be any pattern classification technique, e.g., any state-of-the-art or other pattern classification techniques.

A "model validity assessment algorithm" may use information based on the amount of data used for creating each part of the "user specific model" and return, for each part of the "user specific model", the information whether the "user specific model" part is valid or not. In an example, the "part" of the model may refer to a neighborhood in the three-dimensional space of the time of the user's leaving the home (i.e., time of the leaving geofence crossing event) vs. the time of the user's arriving back home (i.e., time of the arriving geofence crossing event) vs. the day of the week. The neighborhood may be, for instance, a cube in the three-dimensional space defined by an interval of values of each dimension. Again, referring to the above example, the model validity assessment algorithm may store a number of data points used to create the "user specific model" (a joint probability density function) for each defined neighborhood. A similar example of the model validity assessment is depicted in FIG. 4. It shows two examples of two parts of user specific histogram based model. In the 3D model with day of week, leaving time and time away as dimensions, the first example of the part of the model corresponds to the range [Tuesday, 7:55-8:15, 1-18]. The other part of the model corresponds to the range [Tuesday, 19:45-20:15, 1-18]. As shown still in FIG. 4, the two parts of the model are assessed by retrieving the number of data points (corresponding to the stored past records of geofencing events collected through the Collection mechanism) that were used to build these parts of the model.

A "background model" may be a probabilistic model of behavior patterns of an average user, created from the corresponding data points of virtually all available users. Referring to the above described example, the "background model" may consist of a joint probability density function of the time of a user's leaving the home (i.e., a time of the leaving geofence crossing event) vs. the time of the user's arriving back home (i.e., a time of the arriving geofence crossing event) vs. the day of the week. This joint probability density function may be calculated in the same way as the "user specific model" except that the data from all users are used indiscriminately.

The solution may then work as indicated in the following. The "background model" may be built from data records of virtually all users in the database. The "user specific model" is built separately for each existing user in the database. The "user specific model" is also initialized for each new user. That is, whenever geofencing data are acquired for a new user (a user, whose unique identifier is not yet present in the database).

Whenever the "prediction algorithm" is to be called to calculate a prediction based on the input data (e.g., the time of the user's leaving the home and the actual day of the week), first the "model validity assessment algorithm" may be called to return the validity of the part of the "user specific model" associated with the input data.

If a part of the "user specific model" is assessed as valid, the prediction may be made based on input data and the "user specific model". Otherwise, the prediction may be made based on the input data and based on the "background model". The reader may refer to FIG. 5 for depiction of such situation using one of the two examples of the parts of the user specific models from FIG. 4: there was not enough of data points for one example part of the model and it is replaced by the corresponding part of the background model.

Because the prediction calculated using the "background model" is a best guess with missing information on a specific user, this prediction may minimize prediction error and consequently allow the predictive feature of the geofencing-based product or service to be used, e.g., for a new user of the product/system while there are no data collected for that user.

Further, the "model validity assessment algorithm" may take into account also how much up to date are the data points "supporting" the part of the "user specific model". If, e.g., the data points "supporting" the part of the model are found to be older, in average, than a predefined threshold, then the part of the "user specific model" may be marked as invalid. This may result in using the "background model" instead of the "user specific model" whenever the data supporting the "user specific model" part are out of date. The "user specific model" part will be again marked as valid and used for prediction after enough of relevant recent data of the specific user have been collected.

Yet further, the "model validity assessment algorithm" may compare the most recent data points to the corresponding older data points and mark the corresponding "user specific model" part as invalid if a discrepancy between the two have been found. This may result in automatic adaptation of the "user specific model" so that whenever the user changes his behavior pattern, the model is updated over the short time, while the "background model" is used to bridge the time needed for the model to reflect the new behavior pattern. An example of such assessment may be comparing the predictor performance using the "user specific model" with the predictor performance using the "background model", both based on the recent data. Under normal circumstances, the performance of the predictor using the "user specific model" should be better than the performance of the predictor using the "background model". In case of a rapid change of the user's behavior pattern, the performance of the predictor using the "user specific model" could be worse, which may be used by the "model validity assessment algorithm" to invalidate the "user specific model".

A "user group model" may be built using selected users (instead of all available users) and used instead of the "background model" noted herein. This may be done if one can establish a reliable similarity measure between a user and a user group used to build the "user group model". Such similarity measure may be based on a contextual knowledge of the user, e.g., a user's commuting type and distance, user's geography, user's demographics, and so on. Also, a similarity measure may be established based on the most recently collected user's data points. A selection of users for building the "user group model" may then be based on the chosen similarity measure. The similarity measure may also be used to select the "user group model" relevant for a specific user. Using the "user group model", instead of the "background model", may result in a higher prediction accuracy in the cases when the "user specific model" is marked as invalid by the "model validity assessment algorithm" as long as an assumption of the similarity measure between the predicted user and the user group used to build the "user group model" is correct.

The uniqueness of the presented disclosure may be in "model validity assessment algorithm", "background model", "user group model" and their usage.

While the presented approach may be general and used in various predictive geofencing applications/services, it may be a component of a smart thermostat line, which uses a user's mobile device based geofencing feature to optimally control the user's home's heating and cooling.

Geofencing control with probabilistic prediction of the time returned home may be noted.

An issue associated with probabilistic prediction may be its accuracy. There will always be prediction errors as the real outcome of the predicted value (e.g., user's next arrival time) is a result of a random process of which we only have incomplete information and therefore the probabilistic model is always simplified and using assumptions which do not always hold.

The below presented approach may address the issue of improving accuracy of the probabilistic prediction with incomplete data which may be applied to the geofencing control based product or services, and to other similar tasks.

The solution may incorporate the feature, such as the "data collection mechanism", established and the "user specific model", as noted herein. The latter may be probabilistic model of behavior patterns of a specific user consisting of a joint probability density function (jpdf) of the time that the user spent away from home (time away or $T_{away}$, i.e., difference between the time of the arriving geofence crossing event and the time of the leaving geofence crossing event) vs. time of the user's leaving the home (T, i.e., time of the leaving geofence crossing event) vs. the day of the week (D). The "user specific model" may be built from the geofencing data records previously collected and stored using the "data collection mechanism" described herein and associated with a specific user so that the following may be performed.

For each user, there may be a collection of jpdfs, one per each day of week (7 jpdfs total for Mon-Sun). To build each jpdf, the data from the corresponding day of week are used only. While building the jpdf, the data records may be weighted by how recent they are (i.e., the weights are inversely proportional to the age of the data record). The jpdf may be discretized (forming the multidimensional histogram) with reasonably chosen time steps (e.g., 0.5 hour). The jpdfs may be updated using the new data that keep coming through the "data collection mechanism" as the user keeps using the geofencing controlled product/service. Each time one or multiple data points may be added to the model. The multiple data points may be weighted so that their age is taken into account as described herein.

A "prediction algorithm" that uses the "user specific model" to predict a $T_{away}$ based on known time T and the actual day of the week D so that the array of 2D index values may be calculated in that the first index value is composed from the input values [T, D] (i.e., values for which one desires to predict the $T_{away}$, where T is time of the user's leaving the home, D=day of the week) and other indices are composed from neighboring values to the input values, e.g., [T−1.5 h, D], [T−1 h, D], [T−0.5 h, D], [T+0.5 h, D], [T+1 h, D], [T+1.5 h,D], and so forth, (h stands for hour), where the "neighboring value" refers to a 2D value, so that the value of the "time of the user's leaving the home" belongs to a predefined range of the values located around the input value T (e.g., range T−1.5 h to T+1.5 h), and where the neighboring values are spaced by a predefined discrete interval from each other, e.g., 0.5 h.

The jpdf histogram values of the predicted variable $T_{away}$ that corresponds to the 2D index values, may be looked-up. In the example above, these values may be $P(T_{away}|T-1.5, D)$, $P(T_{away}|T-1.0, D)$, $P(T_{away}|T-0.5, D)$, $P(T_{away}|T, D)$, $P(T_{away}|T+0.5, D)$, $P(T_{away}|T+1.0, D)$, $P(T_{away}|T+1.5, D)$.

For each candidate value of $T_{away}$, the weighted average may be calculated using the jpdf histogram values from the preceding paragraph, where each value is weighted by a weight factor that is a function of the distance of the corresponding 2D index value from the first index value (this function may be, e.g., a Mahalanobis distance, inverse proportionality, Gaussian of the distance, and so forth). Following the example above, for each value of $T_{away}$, the weighted average may be shown with a formula 71 indicated in FIG. 14.

The resulting prediction value may be found as the value of $T_{away}$ which maximizes the value of expression from the preceding paragraph.

Geofencing control with probabilistic prediction of the time returned home may be noted.

Further, the above described "user specific model" may be extended in the following. One or more additional input variables (except of the variables of time of the user's leaving the home and the day of the week which were described above) may be used to make a more accurate prediction of the time of the user's arriving back home. Examples of possible additional prediction variables may incorporate actual weather at leaving time, forecasted weather at predicted arrival time, indicator whether the day is a holiday or vacation, time of meetings in user's calendar (if available), context information such as geography (location, urban vs rural), commute type, home type, family status and so on, and time of the additional geofence crossing events (the geofencing may allow setting multiple geofences at multiple places).

Feature selection algorithm techniques (e.g., mutual information based selection) may be used to estimate the impact of the additional input variables to the prediction accuracy by the "prediction algorithm" for each user separately as each variable may or may not be informative with respect to each user's time away.

The additional input variables may be modeled jointly (equivalently to the above described model using the variables T and D) or separately as an ensemble of models, where the final prediction is made by a combination of predictions of ensemble models, or by any combination of these approaches.

Prediction correction "as you go" may be used. In case of change of predicted conditions (e.g., forecasted weather) or in case of receiving new information after the prediction had been made, a new prediction may be calculated. Also, new information may be inferred if some event was not received, while it was expected. For example, a user may usually leave his house at 7 a.m. He either goes to work or he walks a dog for an hour and then goes to work, returning after 10 hours of being away. Now, when the user has left at 7 a.m. and he is still away after 2 hours, one may assume that, more probably, he has gone to work and thus he or she may be away another 8 hours. Therefore, knowing that the user did not return after 2 hours, one may calculate a new prediction with time $T_{away}=10$ h, which can correct the first prediction of $T_{away}=1$ h.

Since the implemented model may provide the jpdf for the prediction, a convenient moment to perform the "as you go" prediction correction may be detected by analysis of peaks in the jpdf or by quantile analysis.

Prediction error modeling may be used. Whenever the prediction error is larger than a predefined value (e.g., 1.5 h), all above described input values may be recorded into a separate database. Once enough data, for a specific user, are present in this database, a new model (jpdf) may be built that allows one to predict the error occurrence based on the input variables. The error prediction may then allow a quicker adaptation to temporal/short-term deviations. An example may be a user who tends to stay at work longer when some deadline is approaching. The "error model" may detect this behavioral pattern and when the user stays at work longer for, e.g., two consecutive days, the "error model" could indicate increased probability of longer stays at work for the next day improving the $T_{away}$ prediction for that day.

The present approach may become a component of a smart thermostat line which may use a user's mobile device based geofencing feature to optimally control the user's home's heating and cooling.

Smart geofencing adjustment may be noted. Geofencing capability may be used as a feature of a smart thermostat at a home to automatically control the home temperature according to user's presence/absence aiming at achieving optimal user's comfort and energy consumption. For example, the home's A/C may start cooling upon the event of geofence crossing by the home occupant on his way back home (event being detected by the localization enabled mobile application on the user's smartphone). Alternatively, the event of geofence crossing (on the user's way out of the house) may be used to trigger a probabilistic predictor of the user's return home. In both these cases, an adjustment of the geofence location is very important for proper function of geofencing based thermostat control, but may be very difficult to choose. In the former example, if the geofence may be set close to the home, the time between the geofence crossing time and the time of user's return home will not necessarily be sufficient for a pre-cooling/pre-heating sequence to achieve a comfortable temperature upon user's return home. In the latter case, the placement of the geofence may influence an uncertainty and consequently an error of a probabilistic prediction. In both cases, a poor choice of the geofence adjustment may cause misses of the geofence crossing event, e.g., due to the poor GPS reception or due to the poor mobile system's connectivity resulting in confusion of the system's state logic and a consequent system's underperformance.

A proper adjustment of the geofence may be critical for a proper function of a geofencing control feature of the thermostat.

The presented approach may incorporate a smart geofence adjustment that either suggests to a user an optimal geofencing adjustment in a semi-automatic fashion, or adjusts the geofencing fully automatically.

A smart geofencing adjustment of a geofencing controlled application or service may be such so that one or multiple geofences are defined as a geo-location and a perimeter, and the geofencing control mechanism is defined as either direct trigger or prediction based.

The direct trigger geofencing control may mean that the geofencing crossing event directly triggers the control mechanism. For example, if the user associated with the geofence crosses the predefined geofence upon his arrival to home, the thermostat may be instructed to turn the home's heating/cooling up towards achieving the user's home temperature upon once the resulting geofence crossing event is issued.

The prediction based geofencing control may mean that the geofencing crossing event only triggers the prediction mechanism, which in turn drives the control mechanism. For example, if a user associated with the geofence crosses the predefined geofence upon leaving from home, the resulting geofence crossing event may trigger the prediction calculation task (e.g., embedded in the thermostat or a part of the cloud infrastructure). The thermostat may then be instructed to turn the home's heating/cooling up towards achieving the user's home temperature according to a prediction of the time of the user's return home.

To perform the geofencing adjustment calculation, the present approach may take into account one or more following aspects. A user's behavioral patterns may be related to leaving a user's home and arriving back, for example, commuting to work, shopping, regular leisure activities, or the like. A user's home temperature presets may involve a setback temperature (temperature preset for the time when the home is empty), and a user's set points (temperature preset for the time that the home is occupied). As to home geography, such as a home geographical location, one may incorporate geographical relation to public facilities such as schools, shopping centers, restaurants, theaters, entertainment facilities, parks, and so forth.

A home thermal envelope may be a model (physical or statistical) of the home which enables one to predict how long time is needed to achieve the desired home's temperature based on current interior temperature, local climate character such as seasonal weather changes, current local weather such as the home's current outdoor temperature, sunshine/cloud coverage/rain/wind, and weather prediction such as a prediction of the local weather for the following day.

A user's direct inputs may incorporate a geofencing controlled application or service. The application or service may provide a graphic interface which displays the geographical map and lets the user define the places and other aspects related to his or her behavioral patterns and also any other above described aspect related to the geofencing adjustment calculation, and further let the user define the geofences and geofencing event triggering mechanism directly.

The current, the most recent or the historical records of the aspects described above recorded over a certain past time range may be taken into account by the present approach. Moreover, the approach may use also the historical records of the aspects described herein for the home/user associated with the geofence and for the other homes or users using the same geofencing controlled application or service if such data records are available.

The geofencing control mechanism may be as follows. The user's home temperature presets, the local climate character and the home thermal envelope may be used to estimate a ramp up time (i.e., time needed to achieve the user's set points assuming the setback temperature as temperature initial temperature, and assuming a particular home with respect to expected weather for the local climate).

Alternatively, the ramp-up time may be estimated from known current local weather or local weather prediction and from a home's current interior temperature so that the home thermal envelope can be used to calculate the ramp-up time as the time needed to reach the user's set point starting from the current interior temperature given the local weather and its prediction.

Another way to estimate the ramp-up time may be based on the analysis of the historical records of a home's current interior temperature, a user's behavioral patterns and the current local weather. The ramp-up time may be calculated from a home's estimated speed of heating or cooling which may be estimated by statistical methods, e.g., averaging the ramp-up times needed in a past (under the similar local weather conditions).

Yet another way to estimate the ramp-up time may be based on the established similarities among the users and/or homes who are using the same geofencing controlled application or service. Assuming that the same geofencing control based service or product is run for a large number of homes, and that the data records of all the homes are available, e.g., via a database accessible by the service/product, one may define convenient similarity measures among the homes (e.g., the same or similar home geolocation) and use similar homes with known ramp-up time to estimate the ramp-up time of the home associated with the geofence.

An expected user's time to return may be estimated once for the home or may be re-estimated each time the user leaves home based on the knowledge or on the estimate of the user's outside activity.

A direct trigger geofencing control may be selected whenever the expected user's time to return is comparable or larger than the ramp-up time, otherwise the prediction based geofencing control is selected.

One or multiple geofence placements and radii may be calculated. If the direct trigger geofencing control is selected, then geofence's geo-locations may be placed on the places of user's outside activities as indicated in FIG. 11. The places of user's outside activities may be determined based on directly querying the user (the query either by the installer of the geofence controlled application or service, or automated as a part of the geofence controlled application or service) or based on the analysis of frequently visited user's outdoor locations. An analysis of frequently visited user's outdoor locations may be accomplished using the GPS enabled mobile application (e.g., navigation) so that the places of user's outside activities are identified as the geo-locations where the user spends significant time with significant frequency, where the "significant time" and "significant frequency" may be predefined constants or values inferred based on the user's activity analysis.

There may be use of the clustering analysis of the GPS locations logged by the GPS enabled mobile application (using, e.g., a K-means clustering or using the fitting a GPS locations distribution to mixture of Gaussians).

The geofence's perimeters may be adjusted so that a geofence crossing will occur in an area where the GPS reception and mobile signal reception are likely of a high quality.

The geofence's perimeters may also be adjusted so that the geofence crossing may occur so that the expected user's time to return is equal to or larger than the user's home's ramp-up time (larger only in the case that the GPS reception and mobile signal reception restrictions described in the previous paragraph do not allow it to be set to equal).

If the prediction based geofencing control is selected, then the geofence's geo-locations may be placed on a user's home location, the first geofence's perimeter may be adjusted so that the geofence crossing will occur as near to user's home location as possible, auxiliary geofences' perimeters may be adjusted so that the geofence crossings can occur as near to the places of the user's outside activities as possible, and additional auxiliary geofences' perimeters may be adjusted so that the geofence crossings will occur between the home and the places of the user's outside activities.

If the places of the user's outside activities are not known, then the auxiliary geofences' perimeters may be adjusted so that the geofence crossings will occur in regular instances or distances from the home, e.g., 1, 2, 4, 8, 16, 32 miles, and so on. All geofence crossings should occur in an area where the GPS reception and mobile signal reception are likely of a high quality.

The geofencing crossing events may then be used to trigger a prediction mechanism, which in turn drives the control mechanism. For example, if a user associated with the geofence crosses the predefined geofence upon his leaving from home, the resulting geofence crossing event may trigger the prediction calculation task (e.g., embedded in a thermostat or a part of a cloud infrastructure). The prediction calculation task may take into account the time instant(s) of the previous crossing or crossings of other geofence or geofences which represent additional information regarding which behavior pattern that the user currently follows and may increase the accuracy of the time return home prediction. The thermostat may then be instructed to turn the home's heating or cooling up towards achieving a user's home temperature according to a prediction of the time of the user's return home.

If a user provides his or her direct inputs, then the geofence locations, perimeters and conditions of the geofencing triggers may be adjusted according to the user's direct inputs.

The present approach may result in either a suggestion (a geofencing adjustment) to the user through a mobile or web interface, letting the user review and edit the adjustments, and applying the adjustments to the smart thermostat product or a service (a semi-automated option). This option may be implemented using the user interface displaying the geographic map with all geofences and all places of outside activities represented in the map. The approach may apply the adjustments to the smart thermostat product/service directly (a fully automated option).

The present approach may become a component of the smart thermostat line such as a thermostat that which uses a user's mobile device based geofencing feature to optimally control the user's home's heating and cooling.

Typically, a geofence, in a geofencing based application or service, may be defined spatially, by its central geolocation and a perimeter effectively forming a circle or a more complex geometrical shape around this point. If used in a context of triggering actions upon events of crossing the geofence, this may not necessarily be convenient, since an action is often related to a movement towards the central point, and in many cases it can differ based on the speed and/or direction of the movement and its nature (e.g., walking, cycling or driving). So, for instance, if the geofence is defined by a fixed perimeter, moving to the central geolocation may take different times when driving on highway or local road, which can lead to an undesired variation of time difference between crossing the geofence and the actual arrival to the central location.

To recap, a thermostat system having geofencing for control, may incorporate a geofencing device, a thermostat connected to the geofencing device, a computational mechanism configured to receive one or more geofencing events from the geofencing device and to adjust the thermostat, and a heating and cooling system situated in a building and connected to the thermostat. When the geofencing device crosses a geofence in a direction away from a location of the thermostat, a first signal indicating a first event of a geofence crossing may be sent to the thermostat. When the geofencing device crosses a geofence in a direction towards the location of the thermostat, a second signal indicating a second event of a geofence crossing may be sent to the thermostat. An estimated time of arrival of the geofencing device may be determined upon receiving the first signal by the computational mechanism. The thermostat may control the heating and cooling system for achieving a preset temperature within the building by the estimated time of arrival of the geofencing device.

Upon receipt of the second signal from the geofencing device, a re-estimated time of arrival may be determined by the computational mechanism, and the thermostat controls the heating and cooling system for achieving the preset temperature within the building by the re-estimated time of arrival of the geofencing device.

The computational mechanism may determine a thermostat control strategy. Determining the thermostat control strategy may involve a decision whether the thermostat controls the heating and cooling system for achieving a preset temperature within the building by the estimated time of arrival of the geofencing device upon receiving the first signal, or whether the thermostat controls the heating and cooling system for achieving a preset temperature after receiving the second signal. The determining the thermostat control strategy may be reflecting aspects related to a ramp-up time needed by the heating and cooling system and the commute patterns of a user including the ramp-up time needed to achieve a preset temperature in the building and expected commute time of the user to arrive at the building. A target position may be selected. A geofence may be placed about the target position.

The geofence and target position may be chosen so that the geofence is around the building if the thermostat controls the heating and cooling system for achieving a preset temperature within the building by the estimated time of arrival of the geofencing device upon receiving the first signal, or the geofence and target position may be chosen so that the geofence is around the places of frequent activity of the user, in which case the thermostat controls the heating and cooling system for achieving a preset temperature upon receiving the second signal.

The geofencing device may issue signals upon determination of crossing multiple geofences. The computational mechanism may combine signals issued by the geofencing device upon a crossing of multiple geofences and the thermostat controls to achieve a preset temperature upon an estimated time of arrival to home.

The geofencing device may convey to the computational mechanism information related to aspects of immediate activity of the user including a current position of the user, traffic density on a commuting path of the user, mode of transport used by the user, and an estimate of a frequent activity pattern that user may be performing. The computational mechanism may use the information related to aspects of immediate activity of the user, to calculate an estimate of remaining time that the user needs to arrive to the building and send a signal to the thermostat when the estimate of the remaining time is equal to ramp-up time needed by the heating and cooling system to achieve a preset temperature in the building.

The estimated time of arrival may be based on specific probabilistic models of the user, trained on previously collected signals sent by the geofencing device of the user within a predefined period. A validity of the specific probabilistic models of the user, may be assessed upon a time of a new estimation of the time of arrival of the geofencing device. An assessment of the validity of the specific probabilistic models of the user, may be performed by checking how many signals similar to current signals were used to build the specific probabilistic models of the user. Probabilistic models from many users of different buildings may be combined to form probabilistic models of an average user. The probabilistic models of the average user may be used to estimate a time of arrival of the geofencing device if an outcome of the assessment of the validity of the user specific probabilistic models of the user indicate that the user specific probabilistic models are invalid.

The geofence device may be application of a smartphone held by a user.

An approach of geofencing control, may incorporate selecting a target location, placing a geofence about the target location, and detecting an event of a geofence crossing with a localization enabled mobile application on a smartphone carried by a user. The geofence event of a geofence crossing may cause a direct trigger or a prediction based trigger of an action relative to the target location.

The target location may be a house of the user. The direct trigger may be an activation of a thermostat to cause a heating and cooling system to heat or cool the house, when the geofencing device crosses a geofence in a direction towards the location of the thermostat, and a signal indicating an event of a geofence crossing may be sent to the thermostat. The prediction based trigger may be a calculated arrival time of the user to the house, when the geofencing device crosses a geofence in a direction away from the location of the thermostat, and a signal indicating an event of a geofence crossing may be sent to the thermostat, resulting in an activation of the thermostat early enough to ensure that a heating and cooling system heats or cools the house to a pre-set temperature on the thermostat.

The placing of the geofence may be chosen so that an amount of time for the user to reach to the house from a point of a geofence crossing is equal to or larger than a ramp-up time of the heating and cooling system. The ramp-up time may be an amount of time for the heating and cooling system to change a temperature in the house to match a temperature set point on the thermostat.

The calculated arrival time of the user may be a function of a time when the user leaves the house, as well as one or more factors selected from a group incorporating a current day of week, actual weather at a time of a user's leaving home, forecasted weather at a predicted time of arrival at home, indication of whether the actual day is a holiday, vacation or work day, time of meetings by the user, geographical location, commute type, home type, and family status.

A geofence control system may incorporate one or more geofences around a place of interest, and a geofencing detector. The geofence detector may detect and record geofence crossing events. A geofence crossing event toward the place of interest may indicate an arrival time by the geofence detector to a device at the place of interest. The device may ensure that an accomplishment of a specific condition at the place of interest is began before the arrival time. The one or more geofences may be selected from a group of time-based and distance-based geofences.

The place of interest may be a building. The geofence detector may be carried by a user of the building. The device may be a thermostat for controlling a heating and cooling system at the building. The specific condition may be a temperature for the building.

A geofence crossing event going away from the place of interest may indicate a departure time from the place of interest. Departure and arrival times of the user from and to the building may be detected and recorded.

An arrival time of the user may be predicted from probabilistic models. Probabilistic models may be built from records of departure times and corresponding arrival times.

The probabilistic models may incorporate one or more prediction variables selected from a group incorporating a time when the user leaves the house, a current day of week, actual weather at a time of a user's leaving home, forecasted weather at a predicted time of arrival at home, indication of whether the actual day is a holiday, vacation or work day, time of meetings by the user, geographical location, commute type, home type, and family status.

A change of the one or more prediction variables may result in a new arrival time of the user being predicted from the probabilistic models.

The geofence detector may be an application on a smartphone of the user.

One may use geofence crossing events from the geofence detector to calculate and optimally control in real time the heating and cooling system at the building of the user.

U.S. patent application Ser. No. 14/696,725, filed Apr. 27, 2015, is hereby incorporated by reference.

Any publication or patent document noted herein is hereby incorporated by reference to the same extent as if each publication or patent document was specifically and individually indicated to be incorporated by reference.

In the present specification, some of the matter may be of a hypothetical or prophetic nature although stated in another manner or tense.

Although the present system and/or approach has been described with respect to at least one illustrative example, many variations and modifications will become apparent to those skilled in the art upon reading the specification. It is therefore the intention that the appended claims be interpreted as broadly as possible in view of the related art to include all such variations and modifications.

What is claimed is:

1. A thermostat system having geofencing for control, comprising:
    a geofencing device;
    a thermostat connected to the geofencing device;
    a computational mechanism configured to receive one or more geofencing events from the geofencing device and to adjust the thermostat; and
    a heating and cooling system situated in a building and connected to the thermostat; and wherein:
    when the geofencing device crosses a geofence in a direction away from a location of the thermostat, a first signal indicating a first event of a geofence crossing is sent to the thermostat;
    when the geofencing device crosses a geofence in a direction towards the location of the thermostat, a second signal indicating a second event of a geofence crossing is sent to the thermostat;
    an estimated time of arrival of the geofencing device is determined upon receiving the first signal by the computational mechanism;
    the thermostat controls the heating and cooling system for achieving a preset temperature within the building by the estimated time of arrival of the geofencing device; and
    when there is insufficient data for a specific user to the generate the estimated time of arrival, the estimated time of arrival is based at least on part on a probabilistic model of behavior patterns created from a plurality of users in a database.

2. The system of claim 1, wherein upon receipt of the second signal from the geofencing device, a re-estimated time of arrival is determined by the computational mechanism, and the thermostat controls the heating and cooling system for achieving the preset temperature within the building by the re-estimated time of arrival of the geofencing device.

3. The system of claim 1, wherein:
    the computational mechanism determines a thermostat control strategy;
    determining the thermostat control strategy involves a decision whether the thermostat controls the heating and cooling system for achieving a preset temperature within the building by the estimated time of arrival of the geofencing device upon receiving the first signal, or whether the thermostat controls the heating and cooling system for achieving a preset temperature after receiving the second signal;
    the determining the thermostat control strategy is reflecting aspects related to a ramp-up time needed by the heating and cooling system and the commute patterns of a user including the ramp-up time needed to achieve a preset temperature in the building and expected commute time of the user to arrive at the building;
    a target position is selected; and
    a geofence is placed about the target position.

4. The system of claim 3, wherein:
    the geofence and target position are chosen so that the geofence is around the building if the thermostat controls the heating and cooling system for achieving a preset temperature within the building by the estimated time of arrival of the geofencing device upon receiving the first signal; or
    the geofence and target position are chosen so that the geofence is around the places of frequent activity of the user, in which case the thermostat controls the heating and cooling system for achieving a preset temperature upon receiving the second signal.

5. The system of claim 3, wherein:
    the geofencing device issues signals upon determination of crossing multiple geofences; and
    the computational mechanism combines signals issued by the geofencing device upon a crossing of multiple geofences and the thermostat controls to achieve a preset temperature upon an estimated time of arrival to home.

6. The system of claim 1, wherein:
the geofencing device conveys to the computational mechanism information related to aspects of immediate activity of the user including a current position of the user, traffic density on a commuting path of the user, mode of transport used by the user, and an estimate of a frequent activity pattern that user may be performing; and
the computational mechanism uses the information related to aspects of immediate activity of the user, to calculate an estimate of remaining time that the user needs to arrive to the building and send a signal to the thermostat when the estimate of the remaining time is equal to ramp-up time needed by the heating and cooling system to achieve a preset temperature in the building.

7. The system of claim 1, wherein:
the estimated time of arrival is based on specific probabilistic models of the user, trained on previously collected signals sent by the geofencing device of the user within a predefined period;
a validity of the specific probabilistic models of the user, is assessed upon a time of a new estimation of the time of arrival of the geofencing device;
an assessment of the validity of the specific probabilistic models of the user, is performed by checking how many signals similar to current signals were used to build the specific probabilistic models of the user;
probabilistic models from many users of different buildings are combined to form probabilistic models of an average user; and
the probabilistic models of the average user are used to estimate a time of arrival of the geofencing device if an outcome of the assessment of the validity of the user specific probabilistic models of the user indicate that the user specific probabilistic models are invalid.

8. The system of claim 1, wherein the geofence device is an application of a smartphone held by a user.

9. A method of geofencing control, comprising:
selecting a target location;
placing a geofence about the target location; and
detecting an event of a geofence crossing with a localization enabled mobile application on a smartphone carried by a user; and
wherein the geofence event of a geofence crossing causes a direct trigger or a prediction based trigger of an action relative to the target location; and
wherein when there is insufficient data for a specific user to the generate a prediction for the prediction based trigger, the prediction is based at least on part on a probabilistic model of behavior patterns created from a plurality of users in a database.

10. The method of claim 9, wherein:
the target location is a house of the user;
the direct trigger is an activation of a thermostat to cause a heating and cooling system to heat or cool the house, when the geofencing device crosses a geofence in a direction towards the location of the thermostat, and a signal indicating an event of a geofence crossing is sent to the thermostat; and
the prediction based trigger is a calculated arrival time of the user to the house, when the geofencing device crosses a geofence in a direction away from the location of the thermostat, and a signal indicating an event of a geofence crossing is sent to the thermostat, resulting in an activation of the thermostat early enough to ensure that a heating and cooling system heats or cools the house to a pre-set temperature on the thermostat.

11. The method of claim 10, wherein:
the placing of the geofence is chosen so that an amount of time for the user to reach to the house from a point of a geofence crossing is equal to or larger than a ramp-up time of the heating and cooling system; and
the ramp-up time is an amount of time for the heating and cooling system to change a temperature in the house to match a temperature set point on the thermostat.

12. The method of claim 10, wherein the calculated arrival time of the user is a function of a time when the user leaves the house, as well as one or more factors selected from a group comprising a current day of week, actual weather at a time of the user's leaving home, forecasted weather at a predicted time of arrival at home, indication of whether the actual day is a holiday, vacation or work day, time of meetings by the user, geographical location, commute type, home type, and family status.

13. A geofence control system comprising:
one or more geofences around a place of interest; and
a geofencing detector; and
wherein:
the geofence detector detects and records geofence crossing events;
a geofence crossing event toward the place of interest indicates an arrival time by the geofence detector to a device at the place of interest;
a geofence crossing event going away from the place of interest indicates a departure time from the place of interest, wherein the departure time is used to predict an estimated arrival time before the geofence crossing event toward the place of interest indicates the arrival time and if insufficient data is available for a specific user, the estimated arrival time is based at least on part on a probabilistic model of behavior patterns created from a plurality of users in a database; and
the device ensures that an accomplishment of a specific condition at the place of interest is began before the arrival time; and
the one or more geofences are selected from a group of time-based and distance-based geofences.

14. The system of claim 13, wherein:
the place of interest is a building;
the geofence detector is carried by a user of the building;
the device is a thermostat for controlling a heating and cooling system at the building; and
the specific condition is a temperature for the building.

15. The system of claim 14, wherein:
departure and arrival times of the user from and to the building are detected and recorded.

16. The system of claim 15, wherein:
an estimated arrival time of the user is predicted from user specific probabilistic models; and
user specific probabilistic models are built from records of departure times and corresponding arrival times.

17. The system of claim 16, wherein the user specific probabilistic models incorporate one or more prediction variables selected from a group comprising a time when the user leaves the house, a current day of week, actual weather at a time of the user's leaving home, forecasted weather at a predicted time of arrival at home, indication of whether the actual day is a holiday, vacation or work day, time of meetings by the user, geographical location, commute type, home type, and family status.

18. The system of claim 17, wherein a change of the one or more prediction variables can result in a new arrival time of the user being predicted from the probabilistic models.

19. The system of claim 16, wherein the geofence detector is an application on a smartphone of the user.

20. The system of claim 14, wherein one can use geofence crossing events from the geofence detector to calculate and optimally control in real time the heating and cooling system at the building of the user.

* * * * *